US012277214B2

(12) United States Patent
Iila et al.

(10) Patent No.: US 12,277,214 B2
(45) Date of Patent: Apr. 15, 2025

(54) DATA MANAGEMENT AND GOVERNANCE SYSTEMS AND METHODS

(71) Applicant: Intertrust Technologies Corporation, Milpitas, CA (US)

(72) Inventors: Kristo Iila, Tallinn (EE); Eric Swenson, Soquel, CA (US); Oleg Mürk, San Francisco, CA (US); Rando Valt, Tallinn (EE)

(73) Assignee: Intertrust Technologies Corporation, Berkeley, CA (US)

( * ) Notice: Subject to any disclaimer, the term of this patent is extended or adjusted under 35 U.S.C. 154(b) by 147 days.

(21) Appl. No.: 17/942,097

(22) Filed: Sep. 9, 2022

(65) Prior Publication Data

US 2023/0090190 A1    Mar. 23, 2023

Related U.S. Application Data

(60) Provisional application No. 63/243,067, filed on Sep. 10, 2021.

(51) Int. Cl.
*G06F 17/00* (2019.01)
*G06F 21/53* (2013.01)
*G06F 21/62* (2013.01)
*H04L 29/06* (2006.01)

(52) U.S. Cl.
CPC .......... *G06F 21/53* (2013.01); *G06F 21/6227* (2013.01); *G06F 2221/2101* (2013.01); *G06F 2221/2141* (2013.01)

(58) Field of Classification Search
CPC ............................. G06F 21/53; G06F 21/6227
USPC ............................................................ 726/1
See application file for complete search history.

(56) References Cited

U.S. PATENT DOCUMENTS

| | | | |
|---|---|---|---|
| 2015/0161373 A1* | 6/2015 | Ortiz-Munoz | .......... H04L 63/10 726/7 |
| 2017/0329957 A1 | 11/2017 | Vepa et al. | |
| 2019/0129888 A1* | 5/2019 | Bowman | ............... G06F 3/0604 |
| 2020/0250328 A1* | 8/2020 | Swenson | ............. G06F 21/6218 |

OTHER PUBLICATIONS

Jan. 4, 2023 International Search Report—International Application No. PCT/US2022/043158 (5 pgs).
Jan. 4, 2023 Written Opinion of the International Searching Authority—International Application No. PCT/US2022/044134 (5 pgs).

\* cited by examiner

*Primary Examiner* — Brandon Hoffman
*Assistant Examiner* — Samuel Ambaye
(74) *Attorney, Agent, or Firm* — John P. Davis; Thayne and Davis LLC

(57) ABSTRACT

This disclosure relates to, among other things, scalable data processing, storage, and/or management systems and methods. Certain embodiments disclosed herein provide for a data management architecture that allows for more secure storage of enterprise data, making it more secure, usable, and/or interoperable, facilitating data usage across information silos. Further embodiments provide for comprehensive data access authentication and/or authorization functionality between various services included in embodiments of the disclosed architecture.

17 Claims, 6 Drawing Sheets

DATA MANAGEMENT AND GOVERNANCE SYSTEMS AND METHODS

RELATED APPLICATIONS

This application claims the benefit of priority under 35 U.S.C. § 119(e) to U.S. Provisional Patent Application No. 63/243,067, filed Sep. 10, 2021, and entitled "DATA MANAGEMENT AND GOVERNANCE SYSTEMS AND METHODS," the contents of which is hereby incorporated by referenced in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for securely managing data. More specifically, but not exclusively, the present disclosure relates to systems and methods for managing data, enforcing rights and/or other management conditions associated with data, and/or providing execution environments to facilitate collaboration between entities interacting with data.

Enterprises generate and store valuable data in many internal and/or external applications. To ensure that data consumers do not duplicate and/or expose their data and/or create governance and security risks, many enterprises may wish to identify their valuable data and ensure it is accessed in a secure, manageable, and/or otherwise governable manner.

Systems and methods disclosed herein provide for various mechanisms to address these challenges. In various embodiments, the disclosed systems and methods may be used to govern data where it resides without duplication and/or migration, on-premises and in the cloud, enforce audit data access to ensure compliance with governmental, jurisdictional, and/or industry regulations, provide secure execution environments to facilitate collaboration with partners and service providers without exposing data, and/or the like.

Various embodiments disclosed herein may be described in connection with one or more non-limiting examples. Certain non-limiting examples may reference a fictional enterprise ACME to illustrate various aspects of the disclosed systems and methods. In various examples, ACME may be associated with data that spans across multiple departments (e.g., sales, service, human resources, etc.) and/or geographic locations. Each department may use different tools and/or technologies to access, manage, and/or interact with the data based on business needs. The geographic diversity of the enterprise may introduce certain challenges with respect to how the data is maintained and/or managed (e.g., GDPR restrictions and/or the like). Various non-limiting examples relating to ACME described herein may illustrate how aspects of the disclosed systems and methods may address various challenges relating to data governance and/or management, and should be viewed as illustrative of various embodiments and not restrictive.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
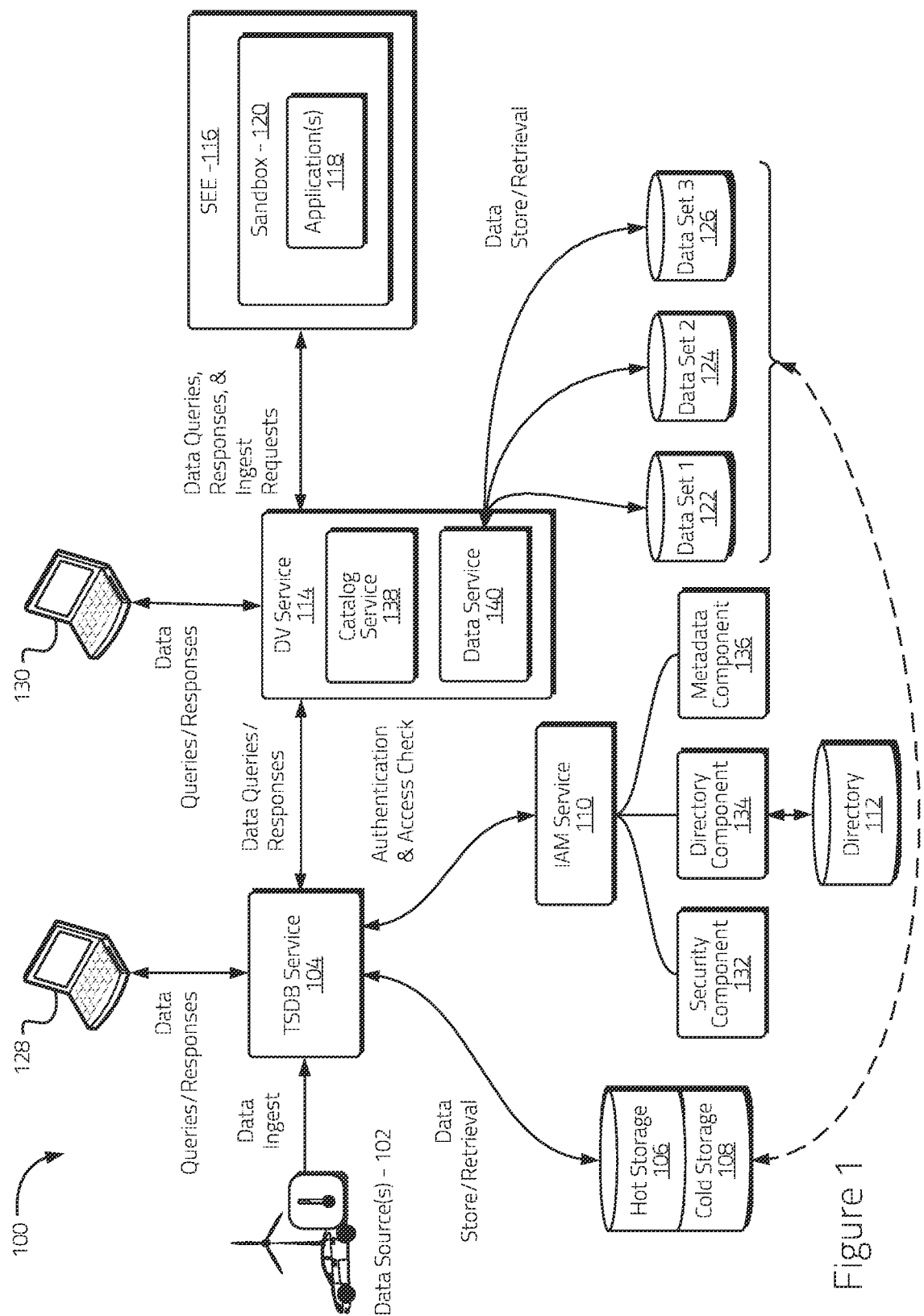
FIG. 1 illustrates a non-limiting example of a data management architecture and associated interactions consistent with certain embodiments disclosed herein.

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Embodiments of the disclosed systems and methods provide for a data management service that facilitates for secure data rights management and governance, interoperability, and/or analytics capabilities in a deployment-agnostic environment. In some embodiments, the data management service may be designed, at least in part, to serve the needs of enterprise data workflows. The data management service may comprise multiple services focusing on specific aspects of the data lifecycle including, for example and without limitation, ingestion, storage, analysis, processing, access, and/or distribution.

In certain embodiments, aspects of the disclosed data management service may make enterprise data more secure, usable, and/or interoperable, facilitating data usage across information silos, potentially without the need to re-engineer system architectures or move large amounts of data to new systems. Various embodiments may be integrated in connection with existing software ecosystems to provide security and governance solutions without significantly disrupting established workflows. In some embodiments, application programming interfaces ("APIs") may be used to integrate various developer applications. The data management service may further provide comprehensive authentication, authorization, and/or data access features to applications via suitable protocols.

Various embodiments of the disclosed data management service may provide a combination of services and/or applications that may include, for example and without limitation, one or more of a:

Identity and Access Management ("IAM") service, which may comprise security, directory, and/or metadata, components, and/or services, etc.

Data virtualization ("DV") service, which may comprise catalog services, data services, etc.

Secure Execution Environment ("SEE") service.

Time Series Database ("TSDB") service.

Audit service.

System Architecture and Example Interactions

FIG. 1 illustrates a non-limiting example of a data management architecture 100 and associated interactions consistent with certain embodiments disclosed herein. Various components and/or services of the illustrated architecture 100, as well as non-limiting examples of interactions between the illustrated components and/or services and other users, systems, and/or services, are described herein below. It will be appreciated that a number of variations can be made to the architecture 100 and associated relationships, examples, and/or interactions within the scope of the inventive body of work. For example, and without imitation, certain illustrated and/or described components and/or services may be combined and/or distributed between multiple components, systems, and/or services.

As shown in FIG. 1 and described in detail below, the architecture 100 may comprise one or more data sources 102, a TSDB service 104 which may interact with one or more storage layers 106, 108, an IAM service 110 may include and/or otherwise interact with an associated directory 112, a DV service 114, and an SEE 116 which may be used to execute one or more applications 118 in a protected manner using a sandboxed execution environment 120. In some embodiments, by interacting with a DV service 114, one or more physical and/or virtual data sets 122-126 may be accessed, which in some implementations may be associated with and/or map to data stored and/or managed by the TSDB service 104 in one or more service layers.

Consistent with embodiments disclosed herein, one or more data sources 102, which may include, for example and without limitation, Internet of Things ("IOT") devices, wind turbine systems and/or associated sensors, nuclear reactor and/or other energy generation systems, manufacturing facility systems, vehicles and/or associated systems and/or sensors, and/or the like may ingest data to the TSDB service 104. Although illustrated as providing data for ingestion directly to the TSDB service 104, it will be appreciated that the one or more data sources 102 may provide the TSDB service 104 data for ingestion via one or more intermediary systems and/or services. For example, in various embodiments, the data sources 102 may comprise an original source of data (e.g., a source that generated data) and/or a source that provides data for ingestion into the service. As used herein, depending on context, the term "data source" may also be used to describe a data source object to which data sets are bound, with the data source referring to a location where the stored data in a data set resides (e.g., a SQL database, an AWS/S3 parquet file, elastic search, etc.)

The TSDB service 104 may, based on information included in a data ingestion request issued by a data source 102 seeking to ingest data into the service, authenticate and/or perform data ingestion access checks and/or any other relevant permission checks with an IAM service 110. As detailed herein, the IAM service 110 may interact with a directory 112 in connection with data access and/or ingestion requests and/or other permission checking processes.

If a data source 102 seeking to ingest data into the service is permitted to do so (e.g., based on an interaction with the IAM service 110), the TSDB service 104 may store the ingested data in a hot storage layer 106. Consistent with embodiments disclosed herein, data stored in the hot storage layer 106 may be migrated into storage in a cold storage layer 108.

In at least one non-limiting example, a privileged user system 128 may query the TSDB service 104. The query may comprise, for example and without limitation, information identifying the queried data and/or data sets and/or credentials and/or other associated identification information that may be used to authenticate the user system 128 and/or an associated application and/or user. The TSDB service 104 may query the IAM service 110 to determine whether the privileged user system 128 and/or an associated user and/or application is authenticated and/or is permitted to access and/or otherwise use the queried data, potentially interacting with a directory 112 in connection with authentication and/or access determinations.

If the user system 128 is authenticated and permitted access, the TSDB service 104 may retrieve the queried data from the hot storage layer 106 and/or cold storage layer 108. The TSDB service 104 may then provide the retrieved data to the user system 128.

In another non-limiting example, an application 118 executing within a sandboxed execution environment 120 of an SEE 116 may query the DV service 114 for data and/or a data set managed by the TSDB service 104. In various embodiments, the DV service 114 may comprise one or more constituent services which may include, for example and without limitation, a catalog service 138 and/or a data service 140. As discussed in more detail below, the catalog service 138 may, for example and without limitation, manage data sets and/or DV objects. The data service 140 may, for example and without limitation, query and/or perform certain other procedures in connection with data sets which may comprise one or more virtual data sets 122-126. As used herein, in the interests in clarity and explanation, certain functionality of the constituent services of the DV service 114 (e.g., the catalog service 138, data service 140, etc.) may be generally described as being performed by the DV service 114. In certain other instances, however, some DV service functionality may be described as being performed by the constituent catalog service 138 and/or data service 140. For example, in some embodiments, certain service calls that may involve constituent DV service 114 services may be described herein as being directly issued to the catalog service 138 and/or the data service 140.

The DV service 114 may authenticate the application 118 and/or an associated user by querying the IAM service 110 to authenticate the application 118 and/or user and/or to determine whether the application 118 and/or user are permitted to access and/or otherwise use the queried data and/or data set. If the application 118 and/or user are authenticated and/or are permitted to access and/or otherwise use the queried data and/or data set, the DV service 114 may query the TSDB service 104 for the data and/or data set.

The TSDB service 104 may authenticate the DV service 114 and/or determine associated access and/or permission rights (e.g., by interacting with the IAM service 110). The TSDB service 104 may retrieve the queried data from the hot storage layer 106 and/or cold storage layer 108, and return the queried data and/or data set to the DV service 114 for communication to the requesting application 118.

In a further non-limiting example, an application 118 executing within a sandboxed execution environment 120 of an SEE 116 may query the DV service 114 for access to and/or use of one or more virtual data sets 122-126 managed by the DV service 114. In certain embodiments, the one or more virtual data sets 122-126 may be mapped to and/or be associated with data and/or data sets managed by the TSDB service 104. In further embodiments, the one or more virtual data sets 122-126 may be mapped to and/or be associated with data and/or data sets that are not managed directly and/or indirectly by the TSDB service 104 (e.g., data outside the TSDB service 104). The DV service 114 may authenticate the application 118 and/or an associated user by querying the IAM service 110 to authenticate the application 118 and/or user and/or determine whether the application 118 and/or user are permitted to access and/or otherwise use the queried data and/or data set(s). If the application 118 and/or user are authenticated and/or permitted to access and/or otherwise use the queried data, the DV service 114 may retrieve the requested data and/or data sets.

The application 118 may further interact with the DV service 114 in connection with storing data as one or more virtual data sets 122-126 managed by the DV service 114. For example, the application 118 may request that the DV service 114 ingest certain data into the one or more virtual data sets and/or the TSDB service 104. The DV service 114 may interact with the IAM service 110 in connection with authenticating the application 118 and/or the associated user and/or determining whether the application 118 and/or user is permitted to ingest data into the DV service 114. If permitted, the DV service 114 may ingest the data into the one or more virtual data sets 122-126 managed by the DV service 114 and/or the TSDB service 104.

In some embodiments, users may directly query the DV service 114 for data managed in one or more virtual data sets 122-126 and/or the TSDB service 104. For example, as illustrated, a user system 130 may query the DV service 118 for accessing data managed by the DV service 118 and/or the TSDB service 104. The DV service 114 may interact with the IAM service 110 in connection with authenticating the user system 130 and/or the associated user and/or determining whether the user system 130 and/or user is permitted to access the queried data. If authenticated and/or otherwise permitted, the DV service 114 may provide the requesting user system 130 with the queried data and/or data sets.

In certain embodiments, an application 118 running within the sandbox environment 120 of the SEE service 116 may be permitted to query some data (e.g., have access to some data/function) by virtue of the fact that it is running in the sandbox environment 120. If running outside the sandbox environment 120, however, the application 118 may not be permitted to successfully make the query depending on applicable rules (if any).

Various aspects and/or details relating to the components and/or services of the illustrated architecture 100, as well as further non-limiting examples of interactions between the illustrated components and/or services and other users, systems, and/or services, are described in more detail below.

Data Management Service Applications

Embodiments of the disclosed data management service may provide services to application developers that allow them to create secure applications and/or applications that interact with various systems and/or services of the disclosed architecture. In various implementations, applications may comprise one or more of:

Applications deployed with the data management service such as, for example and without limitation, an IAM application, a catalog application, an SEE application, a TSDB application, an audit application, and/or the like.

Applications running in the SEE 116 that may be deployed and monitored by the SEE service. These applications may use data management service APIs and may be developed by users of the data management service.

Applications deployed outside of the data management service that may use APIs and/or services provided by the data management service.

Data Management Service—APIs

Data management service users may access services through service APIs. Data management service developers may call service APIs in their applications. Data management service users and/or managers may use an application, which may invoke APIs on their behalf.

Data management service APIs may provide a programmatic interface to data management service functionality. For example, there may be APIs used to access data from data sets, to create an organization, account, and/or or group object, and/or to run a workload on a cluster (e.g., a Kubernetes cluster). Data management service APIs may be exposed by core data management services that may include, for example and without limitation, the IAM service 110, SEE service 116, catalog service, DV service 114, and/or TSDB service 104. For example, data management service applications may authenticate users by calling IAM service APIs.

Data Management Services—Application Development

Data management service developers can use any programming language to build applications. Data management services may be referenced via REST-based APIs, and thus, in some embodiments, any language with the ability to make HTTP requests can be used. Developers can also build applications in one or more containers, reference them in a component, reference that component in a workload, and/or run the workload under SEE 116 in a cluster.

Developers can use different services for their applications including, for example and without limitation, one or more of:

IAM services 110, which may comprise security, directory, and metadata services, to perform identification, authentication, and authorization, as well as to manage the large set of data management service entities (such as organizations, users, accounts, groups, sources, applications, clients, and so on).

SEE services 116 to manage workloads, clusters, and cluster instances and to support running workloads on cluster instances.

Catalog service(s), which may comprise definitions and mappings of data sources, data sets, procedures, and/or workspaces. Catalog services may also perform create, read, update, delete ("CRUD") operations on them. In some embodiments, a procedure may comprise a type of data management service object managed by the catalog service. A procedure may be used to both query and/or update a data set. Procedure objects, like other data management service objects, may be governed objects with operations on such objects governed based on privileges associated with those operations.

DV service 114, which may govern access to data sources and data sets, and may restrict access based on values returned from an access check (including restriction enforcement).

Identity and Access Management

An IAM service 110 may define and enforces security rules by managing the relevant entities and providing identification and authorization services (e.g., OAuth2-and OpenID Connect-based). IAM services 116 may comprise security, directory, and metadata components 132, 134, 136.

IAM Service—Access Tokens

Data management service users may log into the system and receive access tokens. These tokens may be used to authenticate users in data management service API calls. Access tokens may be obtained through the IAM service 110. To obtain an access token without going through a web application, users may invoke the correct IAM service endpoint and specify appropriate client credentials (e.g., a client ID and client secret, user and/or API key credentials, etc). In some embodiments, user credentials may comprise an email address or username and a password, although it will be appreciated that a variety of other user credentials may also be used. API key credentials may comprise an API key ID and/or an API key secret. When users access a data management service web application, they may be redirected to the IAM service 110 to log in. The IAM service 110 may then, after successful authentication, return an access token to the web application, which then may pass it to the various data management services (e.g., via data management service APIs).

Access tokens may be used to obtain one or more of, for example and without limitation, an account ID, tenant ID, client ID, application ID, and/or an organization ID associated with a logged-in session.

In certain embodiments, access tokens may have a limited and/or configurable lifetime. In certain implementations, security may be improved by limiting the lifetime of an access token, potentially to relatively short durations (e.g., 1 hour). For reasons of user convenience, however, a longer lifetime may be used (e.g. 1 week). Once expired, the user and/or application that acquired the access token may acquire a new access token in order to continue making API calls to the data management services. In certain embodiments, there may be multiple ways to re-acquire an access token. For example, user and/or API key credentials may be provided in the same and/or a similar manner as the initial access token is acquired.

In further embodiments, a refresh token may be used, which may be optionally issued when an access token is issued. In some embodiments, a refresh token may be a single use token. In certain embodiments, the refresh token may have a longer validity period than an access token. It may be provided to the IAM service 110 to get a new access token and refresh token. The expiration interval of the access tokens and refresh tokens may be specified at the deployment level and/or at the tenant level (e.g., on a per organization basis).

IAM Service—Security Component

A security component 132 of the IAM service 110 may manage rule sets, which may include rules that describe the privileges granted to the data management service subjects for accessing specified data management service objects. Rule subjects may comprise accounts, groups, and/or organizations, while a rule object may be any data management service entity in the directory.

In some embodiments, the security component 132 may manage role grants, which may provide role-based access control services. Role grants may grant specific roles to subjects. Roles, in turn, may name policies, which may define rules similar to those in rule sets. In some embodiments, the subject may be excluded, because the subject may be specified in the role grant.

APIs provided by the security component 132 may be used to, among other things:
  Perform identification, authentication, and/or authorization for data management service subjects.
  Perform access checks for built-in and custom entities.
  Enumerate accessible objects for an account.
  Determine which subjects have access to specified objects, including the privileges these subjects have been granted.

In various embodiments, the governed entities may include entities managed by the catalog service (e.g., data sets, data sources, procedures, and/or workspaces), the SEE service 116 (e.g., components, workloads, deployments, and/or namespaces, etc.), the TSDB service 104 (e.g., tables and/or namespaces), as well as entities managed by the IAM service 110 itself (e.g., organizations, accounts, groups, folders, etc.). Governed entities may also be custom entities, which may be defined by customers and/or represent application-specific entities.

Identification, Authentication, and Authorization of Subjects

Data management service subjects may be first identified and/or otherwise recognized by the system, authenticated, and then authorized to use the system. Identification may involve maintenance of an account ID, where user accounts may be associated with an ID unique among other data management service entities. Authentication may involve data management service subjects presenting credentials so that IAM service 110 can validate them. In some embodiments, authentication may be delegated to external' third-party identity providers, such as those using Security Association Markup Language ("SAML") or OpenID Connect, and/or Lightweight Directory Access Protocol ("LDAP"). As discussed in more detail below, subjects may comprise, for example and without limitation, accounts.

In certain embodiments, a human and/or non-human user (e.g., a program, application, and/or device) may be bound to an account that may be authenticated by the IAM service 110. In this manner, a subject may be associated with an account. In access rules, however, a subject may be either an account, an account proxy, organization, service, and/or group. When a user and/or non-human user authenticates, it may be bound to an account (or in the case of an API key, to an account proxy, which in turn, may be bound to an account). As discussed in more detail below, if an account happens to be a member of an organization or group named in an access rule, the subject may be either granted or denied the rights associated with the organization, group, and/or account.

Human users may authenticate themselves using a combination of email address and password, username and password, and/or the like. In some embodiments, non-human actors, such as programs and/or scripts, may authenticate themselves using a combination of API key ID and API key secret. Authorization may comprise determining which privileges data management service subjects have and/or confirming whether data management service subjects are allowed to perform requested operations.

IAM Service—Directory Component

In some embodiments, a directory component 134 may maintain a directory database 112, which in certain instances herein may be referred to generally as the "directory," and may support APIs to manipulate, manage, and/or query the directory 112. For example, the directory component 134 may maintain a directed acyclic graph of data management service objects (which in certain instances herein may be referred to as data management service entities) in the directory 112 such as, for example and without limitation, organizations, groups, accounts, folders, data sets, clusters, etc. Data management service objects may be associated with a "type." There may be IAM service 110 built-in types, and objects of these types may be managed by IAM service 110. In some embodiments, there may also be also custom types, managed by other data management service services, such as the catalog service and the SEE service 110.

To support custom types, the directory 112 may maintain a type registry. Data management services and applications, as well as customer-written applications, can register entity types. In some embodiments, entities of registered types may be created in the directory.

The catalog service may manage data sources, data sets, procedures, and/or workspaces (e.g., folders used to group virtual data sets managed by the DV service 114), which may be added to the directory 112 by the catalog service using IAM service APIs. Once in the directory 112, these entities can be queried and access-checked using IAM service APIs.

Figure 2:
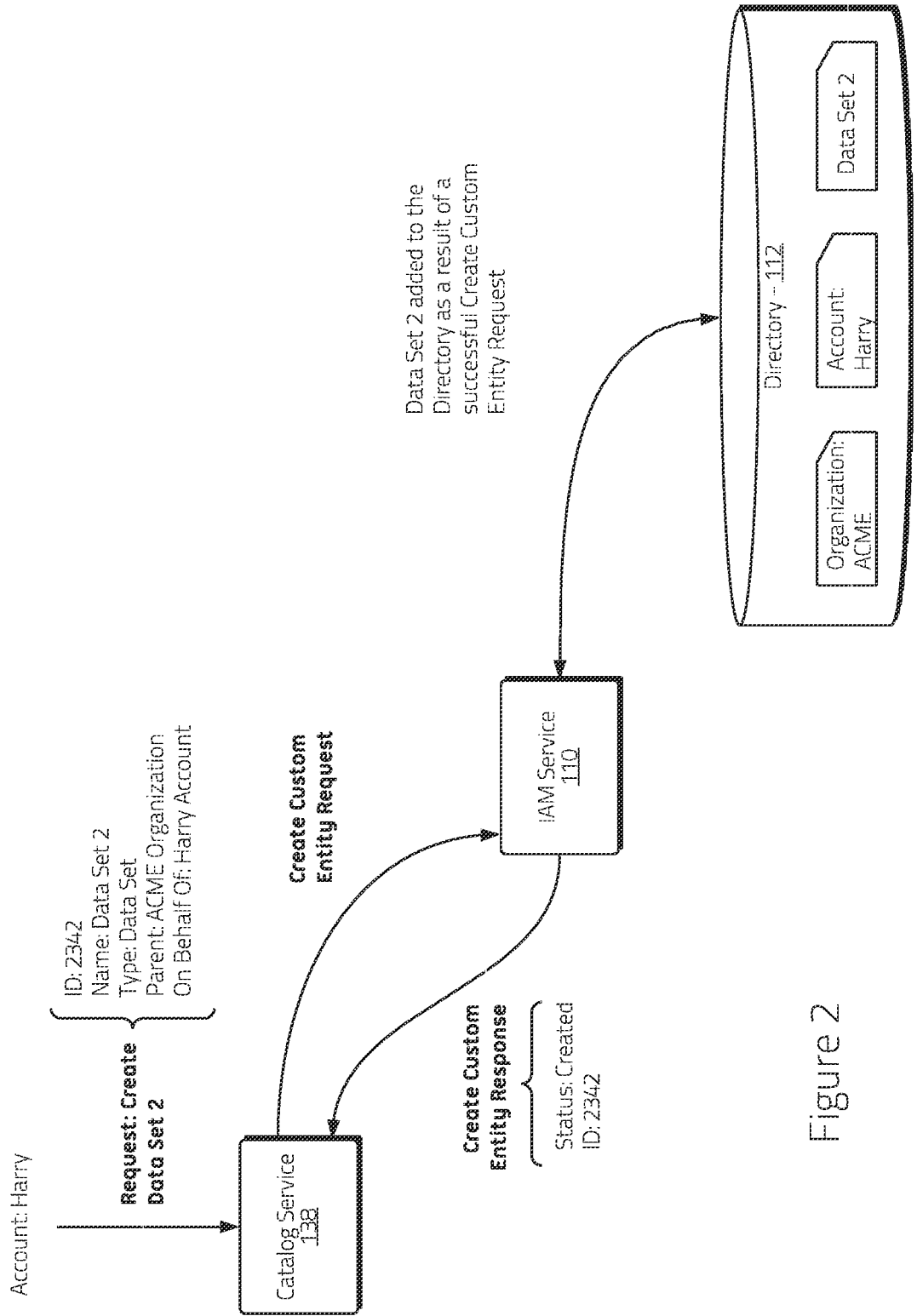
FIG. 2 illustrates a non-limiting example of management of a data set using a directory service consistent with certain embodiments disclosed herein.

FIG. 2 illustrates a non-limiting example of management of a data set using a directory 112 consistent with certain embodiments disclosed herein. As illustrated, a user associated with an account—"Harry"—may issue a request to a catalog service 138, which may be a component of a DV service, that a new data set be created—"Data Set 2." The request may comprise a variety of information including, for example and without limitation, identification information associated with the data set, the user, and/or the request, a name and/or other identifier associated with the data set, a type associated with the request and/or the associated data set, an indication of a parent and/or other organizational relationship associated with the user and/or account (e.g., the ACME organization or the like), identification of the user and/or an account issuing the request, and/or any data to be included in the data set.

The catalog service 138 may interact with the IAM service 110 and issue a custom entity creation request. If authorized and/or otherwise permitted by the IAM service 110, the data set may be added to the directory 112 as a new data set object as a result of a successful custom entity creation request. As shown in the illustrated example, the root parent object of the new data set may be the ACME organization. The IAM service 110 may return a response to the catalog service 138 to the custom entity creation request. The response may comprise, for example and without limitation, a status of the response (e.g., "Granted," "Created," and/or the like), identification information associated with the data set, the user, and/or the request, and/or any other information relative to the creation of the entity by the IAM service 110 in the directory 112.

Figure 3:
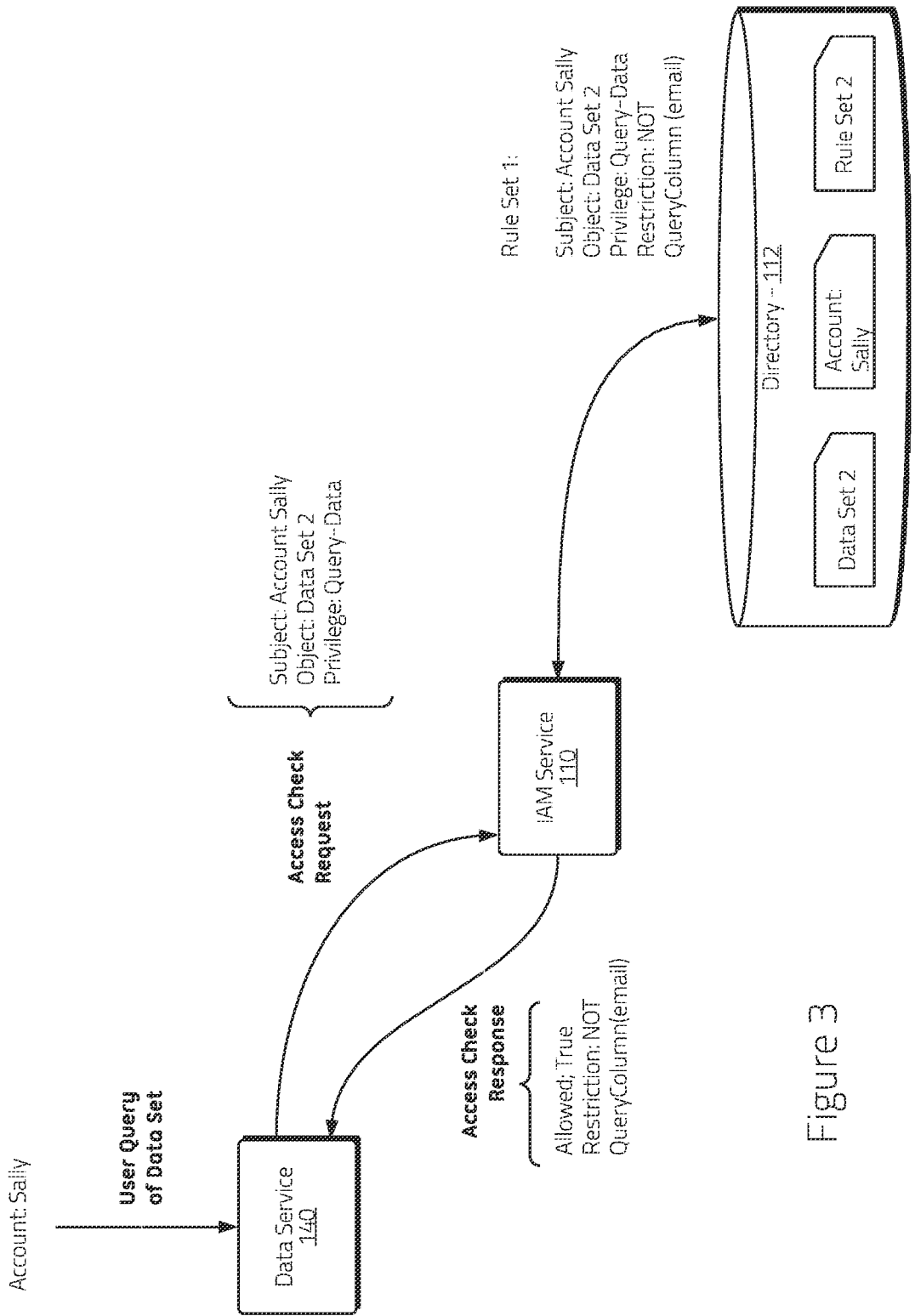
FIG. 3 illustrates a non-limiting example of querying a data set using a directory service consistent with certain embodiments disclosed herein.

FIG. 3 illustrates a non-limiting example of a query of a data set using a directory 112 consistent with certain embodiments disclosed herein. As illustrated, a user associated with an account—"Sally"—may issue a query to a data service 140 for a data set—"Data Set 2." A catalog service may be used to create, update, and/or delete objects in the directory 112. The data service 140 may be used to make queries to data sets and/or to invoke procedures. For example, as illustrated, the data service 140 may interact with the IAM service 110, issuing an access check request to the IAM service 110. The access check request may comprise a variety of information including, for example and without limitation, identification of a subject associated with the request (e.g., "Account Sally"), an object of the request (e.g., "Data Set 2"), and/or a requested access privilege ("Query Data").

The directory 112 may include at least three objects: Data Set 2, an Account for Mary, and Rule Set 1. The rule set—"Rule Set 1"—may specify a subject of the Account for Mary, an object of Data Set 2, and privilege of "Query-Data," and a restriction specifying that Mary is not allowed to view a column "email" in the data set. The IAM service 110 may manage the objects in the directory 112. In response to the query, the IAM service 110 may return an access check response based on the query and the objects managed in the directory 112. For example, the IAM service 110 may return an access check response indicating whether Mary is allowed to query Data Set 2 and/or any restrictions to such access (e.g., restricted from viewing the values in an "email" column in Data Set 2) and/or the like.

Referring back to FIG. 1, other services of the data management service, such as the SEE service 116 and the TSDB service 104 may also manage objects with custom entity types in the directory 112. For example and without limitation, components, workspaces, deployment, and/or vault objects of the SEE service 116, tables and/or workspaces of the TSDB, and/or the like may be managed by the SEE service 116 and/or the TSDB service 104. External applications may also define new entity types and create entities of those types. The IAM service 110 may manage the directory location for these entities, just as it may do for internal entities.

Entity types defined by the IAM service's directory 112 may include, for example and without limitation, accounts, organizations, groups, applications, clients, privileges, privilege sets, rule sets, role grants, roles, policies, and/or the like. Privileges may define which actions are possible on an entity. While there may be many privileges built into the data management service (e.g., pre-defined privileges), custom applications can define their own privilege sets and privileges. These custom privileges can be used in rule sets and policies. Applications and/or services can then invoke APIs of the IAM service 110 to perform access checks on data management service objects and then enforce these privileges and any associated restrictions. While other components and applications can also define privileges, in some embodiments, the directory 112 may specifically enforce system-defined privileges. Data management service objects may be associated with a type and a unique ID and can also have a set of attributes and metadata fields.

In some embodiments, governance objects, which may comprise rule sets and/or role grants, may be stored in the data management service directory 112 along with other data management service objects. This may, among other things, allow the data management service to associate governance on the governance objects themselves, providing the ability to control who can add, delete, and/or update the governance objects.

IAM Service—Metadata Component

The metadata component 136 may support attaching metadata to any data management service entity stored in the directory 112 and may provide APIs to allow querying for metadata as well as searching by metadata for entities in the directory 112. Object attributes can also be used in the restrictions used in rule sets and/or role grants to enable rich access checking of data sets or other entities.

Data Virtualization

DV services 114 may use a common interface to enable granular data access and governance for a diverse set of data sources. In some embodiments, the supported types of data sources may comprise, for example and without limitation, SQL databases with JDBC drivers (e.g., MySQL, PostgreSQL, MS SQL Server, Oracle, Redshift, AWS Athena), TSDB, InCountry, Parquet files (stored, for example, in AWS/S3) and/or the like. DV services 114 may support the joining (as may be the case in SQL JOIN) of heterogenous data sources (e.g., a SQL data source and a flat-file data source). It may also support joining data sources from different geographical locations. The supported data access interfaces may comprise, for example and without limitation, SQL via JDBC and REST APIs. In some embodiments, DV services 114 can also support ANSI SQL queries with a set of geospatial querying functions. In various embodiments, DV services 114 may comprise catalog service and data service components.

DV—Catalog Service

The catalog service may manage data sources, data sets, procedures, and/or workspaces, which may be governed using the IAM service 110 mechanisms. Objects defined in the catalog service may be registered in the directory 112 and/or IAM service 110 may be invoked to perform access checks on these objects. The catalog service may facilitate connections with physical data stores and manage information about them. Users can define different objects using the catalog service including, for example and without limitation, data source objects, physical data set objects, virtual data set objects, procedure objects, and/or workspace objects. Users can grant privileges and specify restrictions on these objects using rule sets and role grants from IAM service 110.

Virtual data sets 122-126 may be derived from physical data sets stored in the hot and/or cold storage layers 106,108 and/or other virtual and/or physical data sets. Virtual data sets 122-126 may query information from multiple data sets, which may be physical and/or virtual. In some embodiments, virtual data sets 122-126 may comprise physical data sets from heterogeneous data sources. For example, virtual data sets 122-126 may map to physical storage of the hot and/or cold storage layers 106, 108. It will be appreciated, however, that virtual data sets 122-126 may, alternatively and/or additionally, may to other virtual and/or physical data sets, including data sets that may not be associated with the TSDB service 104 (e.g., a SQL database table).

DV—Data Service

The data service may be a component of the DV service 114 that can run along with IAM service 110, SEE service 116, catalog service, and/or the TSDB service 104. It can also run along with SEE workloads access to data. In various embodiments, the data service may, among other things:

Implement queries of the data sets and/or enforce the privileges and restrictions defined in the catalog service.

Provide a set of endpoints that allow users to query the data to which they have access.

Accept SQL queries over JDBC protocol.

Support ANSI SQL read queries and implements them across the data stores. For SQL queries that run against a single SQL-based data store, the data service may, in certain implementations, provide assurance of security while adding relatively low latency.

Support a restricted set of data modification commands for data stores where writes are allowed.

Expose a set of REST API endpoints that allows querying of all data sets in the system. The response may be formatted in JSON and may be streaming or fully-rendered.

When resolving queries against data sets derived from other data sets, in some embodiments the data service may operate to ensure that the final query may not reveal more information from the results that would have been returned by the users who created the relevant data sets.

Certain virtual data sets may be queried using "run as" functionality, which may allow sharing of virtual data sets 122-126 with the ability to run queries on the grantor's behalf without exposing the details of the underlying physical data sets. For example, there may be cases where a User A (e.g., a data set admin) would like to share a virtual data set with User B (e.g., a business analyst) and give permission to run queries on their behalf without actually sharing the physical data set on which it was built. User B may not have access to any data sets to begin with but may rely on User A to give them access. For that, User A can specify the "run as" field using the catalog application or the catalog service APIs. In this case, User B may need not have privileges to access the underlying physical data set on which the virtual data set is built. But then they can use "run as" User A feature and run queries on the virtual data set shared with them.

DV—Query Pushdown

When a data set query is executed, the DV service 114 may attempt to optimize query performance by pushing the query down to the underlying physical data source. If a query cannot be pushed down, the query may be retried within the DV service 114. In some embodiments, query pushdown may be the default query execution behavior, but this feature can be configured within the catalog application user interface for individual data sets.

In general, pushdown queries may execute faster due to the capabilities of the underlying data sources to eliminate unnecessary data, especially if appropriate indexing has been configured on the data source. When queries cannot be pushed down to a single data source (e.g., joining data from tables across two or more data sources), DV services 114 may facilitate the query execution itself, which may involve loading all necessary data into memory to process it. To accomplish this, DV services 114 may perform parallel requests to acquire the necessary data from the data sources as multiple partitions.

Secure Execution Environment

SEE services 116 may allow authorized data analysts/scientists/application developers to build and/or run models and/or applications (e.g., application 118) in an isolated sandbox environment 120. Data owners can analyze the permitted data set(s) and maintain granular control over the data. The data management service's SEE 116 may allow enterprises to use and confidently share such data with preferred partners and analytics experts to derive actionable business insights.

The set of applications running in the SEE environment may not be limited, and there may a set of defined frameworks and interfaces that may make it easier to create these applications. Analytics experts can deploy existing workloads from container image sharing services to create new models and algorithms. The SEE service 116 may offer a managed service which isolates/protects most users from having to learn the details and/or certain requirements for implementing container-based workflows.

The SEE service 116 may provide a secure, network-protected environment (e.g., sandboxed environment 120) with resources and scalable for complex, resource (e.g., memory, compute) intensive data processing. Network policies may control the ingress, egress, and/or any form of communication between deployments. In some embodiments, network policies may block or allow such communications. The SEE service 116 may be designed to facilitate collaboration between data scientists and data analysts to create and/or run models and/or algorithms in the secured environment and analyze permitted data set(s).

Deployments running in the data management service SEE environment can access the data service and the SEE service 116 may be gateway to the data management service secured data. The data management service may authenticate and authorize the access by using data management service core APIs. This may enable data owners to allow internal/external analysts and scientists to process the data while having control on who has access to what data.

Consistent with embodiments disclosed herein, SEE services 116 may enable one or more of the following functionalities:

- Setting access rules on a query of DV data such that access is allowed when running within a sandboxed environment 120 and not outside the environment.
- Successfully authenticated and authorized data access requests may get access to permitted data within the SEE service 116.
- Privileged users may be allowed to create a namespace with required resources. In certain embodiments, namespaces may comprise data management service objects that may represent an underlying namespace in the cluster.
- Namespaces may be network protected. Jobs running within may be secured from egress and ingress.
- Container images from public or private container registries (e.g., Docker Hub) can be easily deployed.
- Run servers (e.g. Jupyter notebook server) in SEE 116 and build, import the programs, models, code files (notebook), data files, libraries to run in the servers.
- Privileged users can let other users access their programs (e.g. notebook), components, and container images and work collaboratively.
- Users can view logs of their workloads and monitor their program and model executions in the SEE application 118.
- SEE objects may modularize the deployment process and simplify re-runs.

SEE—Secure Data Access

Data access may be permitted via the data management service following the successful authentication and authorization by the data management service core services.

SEE—Governance

The SEE service 116 may provide governed access controls on different SEE objects. In some embodiments, this governance may follow the same and/or a similar model (e.g., using rules and subjects) as other data management service objects. In some embodiments, containers under data management service management may be deployed, by default, in a least privilege mode. This may help to ensure that the access rights that have been explicitly granted will be enabled.

Governed objects in SEE 116 may include, for example and without limitation, one or more of:

- Namespaces. Namespaces may comprise objects in the data management service directory that correspond to namespaces in the underlying container orchestration environment (e.g., Kubernetes). Namespaces can be governed to control which users can run workloads within the namespace.
- Components (e.g., containers). A component may comprise a SEE object that may encapsulate a container image, the container's parameters, and/or inbound/output connections. It may be a governed object, so its visibility, modifiability, etc., and its "use" may be governed. If the user doesn't have the "use" privilege on the component, they may in some implementations not be able to use it in a workload, and consequently may not deploy a workload that uses this component.
- Workloads (e.g., collections of components). A workload may comprise a SEE object that groups a set of components and may be a deployable unit. A user who has appropriate privileges may "deploy" a workload, in which case a deployment may be created and normally started. A deployment may be a governed object, allowing users who have appropriate privileges to terminate, start, connect to (e.g., via the network), or view logs of components in the deployment. The user may, in some permitted circumstances (e.g., if the subject has edit privileges on a workload object), override parameters for a component when they deploy a workload that references the component, in which case those overridden parameters may live in the deployment object.
- Deployments (e.g., running or already-run workloads). When a workload is deployed it may result in a deployment, which may override parameters associated with the workload. Authorized users may be able to view the logs associated with running and/or already-run deployments. In certain embodiments, a deployment object may be persistent even after a workload associated with it finishes running. In this way, a user can query the logs of a deployment to determine how it performed and/or what it logged.
- Vaults. The credentials for container image registry access as may be required by the data management service in order to pull a container and run it may be protected in vaults. Vaults may be also used for "secret" parameters to components. The SEE service 116 may be able to retrieve these parameters from the vault and pass them into Kubernetes (e.g., as environment variables), so that the component (e.g., container) can use the parameters but not necessarily know the associated values. In some embodiments, there may be two "types" of vaults. One may have a well-defined schema so that the SEE service 116 can find the username/password of a container registry. The other may be freeform in the sense that there may be a less well-defined schema. The first kind may be (optionally) associated with an Image-Source, which itself, may encapsulate the association between a Docker registry URL and the vault where the credentials to that registry are stored. The second kind may be used in "secret" parameters to vaults, so that users may not directly have access to and/or retrieve the values (unless, for example, they have the full-view privilege on the vault).

In certain embodiments, when a less well-defined scheme is used, entities may have knowledge of how to interpret entries in a vault. For example, in the case of a username/password of a container register, the SEE service 116 may have knowledge of how to find the username/password and how to provide these to the container register. In this case, the value may use a well-defined schema. In a customer component, which may involve secret information, arbitrary secrets may be stored in a value, in which the scheme may be less well defined for external components (e.g., the SEE service 116) to discern, as long as the component itself has knowledge of how to find items in the value.

SEE—Isolated Environment

The SEE service 116 may offer a separate isolated environment using a separate managed cluster to execute analytic models, external processes, and applications as workloads. Workloads may be isolated at the network level, and the network policy may safely constrain both ingress and egress. In some embodiments, the SEE service 116 may use the APIs to provide an "isolated by default" environment to run containers and networking. Because there may be an abstract interface that is realized by a Kubernetes implementation, users may not have direct access to Kubernetes, and therefore may go through SEE service APIs with their governance to manipulate the corresponding Kubernetes resources. This interface may allow the users to create a sandbox 120 in which certain operations/computations can be maintained.

Users may allow, for example and without limitation:
- Components to access DV services 114 but not communicate with the outside world.
- Controlled inbound access to these components, rate limiting on the output so that DV service 114 access to data cannot allow exporting raw data, output quantity limiting, historical cumulative access controls, etc.
- Components with access to DV data (e.g, data sets 122-126) walled off from the outside world, producing output that is limited to being input to other components running in SEE service 116 deployments.

In some embodiments, giving direct access to the users to the underlying Kubernetes cluster may allow customer to circumvent the "sandboxing." The SEE service 116 may control access to inbound and/or outbound connections and/or to the creation of services that may provide load balancing and inbound access to components. SEE service APIs may produce audit records providing a security accounting of operations. Through the SEE service 116, the data management service may allow the users to write code and then run that code in an environment where it may manipulate DV-governed data, but not necessarily (without permission) export that data outside of the container.

Referring to the ACME enterprise example, large enterprises may work with third-party service providers who specialize in building applications that address specific business needs. In addition, they may desire an environment which allows relatively straightforward integration of these specialized applications in conjunction with the existing enterprise architecture.

ACME may wish to protect their data asset by sharing it securely and the third party service provider may wish to secure their proprietary application code. In a non-limiting example, User A from ACME may be the data-owner who controls access to input data. Any other user—for example, User B from a third party service provider—may not access the data unless User A provides explicit access via an API key. User B from a third-party service provider can create a component B that accesses the third party's application code through a container register. User B can create the component object with the correct configuration and parameter value and secure the provided credentials for the service to access the component code. User A may not access the proprietary code within component B since they may not have the access credentials, thereby protecting the intellectual property of the service provider. However, User B can give the ability to "use" the component B to User A. Then User A can include this component B in conjunction with his/her own components to perform any complex data operations.

In the above example, User B's code and data may be protected. User A, having limited access to the cluster (e.g., a Kubernetes cluster), may not examine User B's component B, its data, any attached volumes, its logs, its image, its parameters, etc. In other words, User A may have no access to the third party's (e.g., User B's) code, data, and/or artifacts. Had User A had full access to the cluster, on the other hand, User A could have examined the User B's code's image, data, keys, parameters, etc. User A, however, may use component B's functionality (e.g., a machine learning algorithm) to generate some "results" (e.g., output data). User A may be able to control what "input data" component B was able to access. On the other hand, User B may not be able to access any data unless they have been given permissions to do so. Thus, untrusted code can be run in the environment with less worry about data egress from the system.

Timeseries Database

The TSDB 104 may comprise a modern, cloud-based, efficient, compressed, and/or scalable database. The store may be multi-tiered, supporting fast, low-latency access to recent data and cheap storage of older data. Low-latency data may be stored in a key-value store (e.g., Cassandra database). Long term data may be stored as compressed data files in an object storage system (e.g., AWS S3 and/or the like).

In some embodiments, data in the TSDB 104 may be stored in compressed and chunked format, where an index of these data chunks is maintained, thus enabling granular access to data. The data may be organized into namespaces, which can contain multiple data sets (logical representation) and each data set can have multiple projections (physical representation of data). In certain embodiments, namespace objects may be used in connection with both the SEE and TSDB services 116, 104. In some implementations, namespaces may be conceptualized as schemas, data sets as tables, and projections as indexes in the traditional relational database domain. Each data set may contain at least one projection, which may be referred to as primary, but more projections can be defined for a data set.

TSDB—Storage Layers

In certain embodiments, storage may be associated with two layers: hot and cold storage layers 106, 108. In some embodiments, the hot storage layer 106 may store data in Apache Cassandra tables. The hot storage layer 106 may make ingested data available with minimal delay. In certain implementations, a relatively small amount of the most recent data may be stored in the hot storage layer 106.

The cold storage layer 108 may store data in Apache Parquet files saved into AWS S3. In certain implementations, it may offer low cost and very scalable storage at potentially the expense of a longer delay of ingested data being available (and slightly slower data retrieval due to S3 read latency). Data may be added periodically to the cold storage layer 106 according to a defined time aggregation period. To reduce data fragmentation, data compaction can also be configured. The compaction process may merge separate data files of the same time aggregation period into one.

TSDB—Operations

TSDB services 104 may support data inserts, updates, and deletes. Data may be ingested in an arbitrary time order, although to avoid data segmentation, data belonging to the same partition may be ingested in time order. In some embodiments, data may be ingested by sending individual records of full data files to its REST API. For governed data access, the data management service DV service 114 may be used. Additionally, the TSDB service 104 may provide its own data access REST API.

Figure 4:
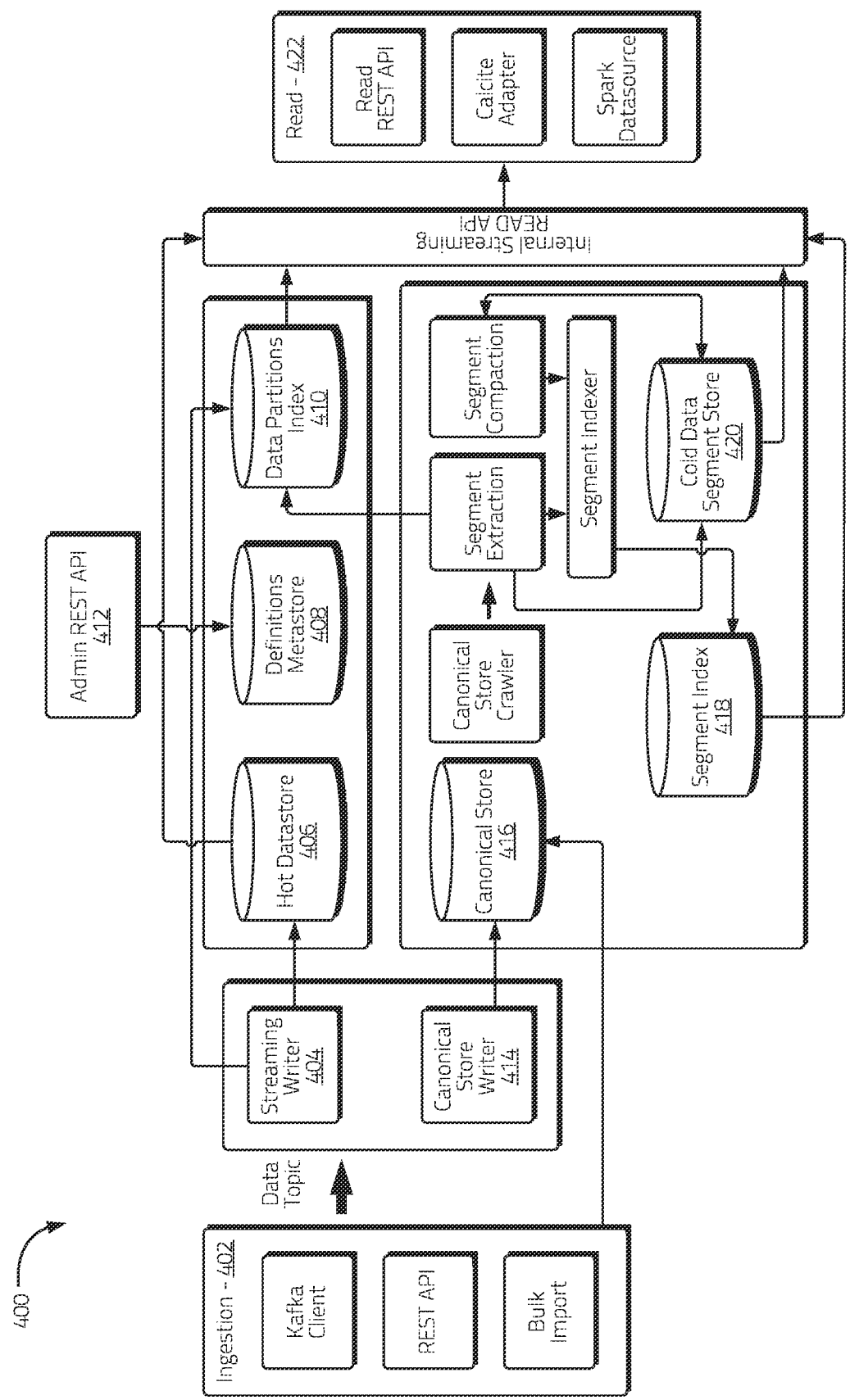
FIG. 4 illustrates a non-limiting example of a timeseries database data management architecture consistent with certain embodiments disclosed herein.

FIG. 4 illustrates a non-limiting example of a TSDB data management architecture 400 consistent with certain embodiments disclosed herein. As shown, the architecture 400 may comprise systems, services, and/or components associated with a hot storage layer and a cold storage layer. The architecture 400 may further comprise systems, services, and/or components shared between the hot and cold storage layers and systems, services, and/or components associated with canonical storage.

Data may be ingested via one or more ingestion layer 402 components, which may comprise, for example and without limitation, a Kafka client, a REST API, and/or bulk import modules and/or interfaces. Data ingested into the data storage and management platform may be published into one or more partitioned topics, which in some implementations may comprise partitioned Kafka topics. In some embodiments, each message published to a topic may have a sequence number within an associated partition. For example, each message published to a Kafka topic may have an offset within a given Kafka topic partition, which may function as a sequence number and/or indicator for various data management operations consistent with embodiments disclosed herein. In some embodiments, the data storage and management platform may expose a REST API that may allow external systems and/or services to insert data records into the platform.

The hot storage layer may comprise a streaming writer 404 and a hot data store 406. From each topic, data may be consumed by a streaming writer 404. In certain embodiments, the streaming writer 404 may be configured to detect which data partition an incoming data record belongs to and may store the record within the proper data partition key into the hot data store 406, which in some implementations may comprise a Cassandra key-value database. The streaming writer 404 may further detect new data partitions from the ingested data records, potentially repartitioning the ingested data if needed (e.g., based on information included in the definitions metastore 402), add the data portions to a data partitions index 410 (if needed), which may be shared between the hot storage layer cold storage layers, and then store the record with the new data partition key in the hot data store 406.

The definitions metastore 408 may provide definitions relating to namespaces, which may allow for different users to operate on and/or process data in a particular table while operating in different namespaces. In some embodiments, the definitions metastore 408 may provide definitions relating to storage levels and/or layer information for data. For example, definitions may be provided regarding whether and/or what data should be stored in a hot storage layer, a cold storage layer, both storage layers, and/or the like, retention periods for stored data, which in some implementations may differ depending on the layer, update information for the hot and/or cold storage layers, criteria for data compaction operations, and/or the like. In this manner, information included in the definitions metastore 402 may help define the logical structure of data, how it should be partitioned by the architecture 400, how it should be written to platform storage, etc. An administrative API 412, which may comprise a REST API, may be used to interact with and/or otherwise manage the definitions metastore 408.

A canonical storage layer may comprise a canonical store writer 414, a canonical store 416, a canonical segment index. Data ingested into the data storage and management may be provided to the canonical store writer 414. The canonical store writer 414 may consume received topic record data, process the data, and/or store the data in a canonical store 416. The canonical store 416 may, in some embodiments, comprise a cloud-based storage service such as, for example and without limitation, AWS S3. Files written to the canonical store 416 may be associated with a record added to the canonical segment index, which may provide index information relating to records stored in the canonical store 416. Data stored in the canonical store 416 may be used in connection with various cold layer storage operations, as discussed in more detail below, partitioning and/or repartitioning operations, data backup operations, and/or the like.

In some embodiments, the cold storage layer may comprise a canonical store crawler, a segment extraction service, a segment compaction service, a cold data segment store 420, a data segment indexer, and a data segment index. Consistent with various disclosed embodiments, data stored in the canonical store 416 and/or index information included in the canonical segment index may be used to build data records within the cold storage layer. For example and without limitation, a canonical store crawler and/or an associated segment extraction service may interact with the canonical store 416 and/or the canonical segment index to access increments of data from the canonical store 416, potentially process the data (e.g., using a segment compaction service), and store the data within the cold data segment store 420. When data is stored in the cold data segment store 420, the segment extraction service may interact with the data segment indexer service to generate one or more records in a data segment index 418 associated with the data stored in the cold data segment store 420.

In certain embodiments, the definitions metastore 408 may comprise information used by various systems, services, and/or components of the disclosed platform to determine which ingested topics should be recorded by the hot data storage layer and the canonical store (and by extension, the cold data storage layer). For example, in some embodiments, the streaming writer 404 and the canonical store writer 414 may use information included in the definitions metastore 408 to determine which ingested data should be recorded in the hot data store 406 and/or the canonical store 416.

In various embodiments, the segment extraction service may store data in the cold data segment store 420 based, at least in part, on information included in the definitions metastore 408. For example, the definitions metastore 408 may include information relating to cold data storage layer data storage and/or update scheduling, which may comprise information relating to update period, update frequency, update data amount thresholds, and/or the like. This information may be used by the segment extraction service to schedule data recordation actions and/or updates from the canonical store 416 to the cold data segment store 420.

In various embodiments, use of a canonical storage layer in conjunction with a cold storage layer consistent with certain aspects of the disclosed systems and methods may allow for certain optimized data, processing, management, retrieval, and/or query functionality. For example and without limitation, the canonical store 416 may store record data in a compacted form, but the partitioning and/or division of data and use of time buckets in connection with the cold data segment store 420 may provide certain data processing, retrieval, management, and/or querying efficiencies not realized directly by the canonical storage layer. Data stored in the canonical store 416 may be further used in connection with data restoration and/or backup operations and/or data repartitioning operations. For example, if data is deleted from the hot storage layer and/or the cold storage layer but remains stored in the canonical store 416, it may be restored to the hot storage layer and/or the cold storage layer from the canonical store 416.

A data read layer 422, which may comprise a read REST API, an adapter (e.g., a Calcite adapter), and/or spark data source engine, may interact with a streaming read API. When retrieving data from the platform, a streaming read API may be queried with relevant query information (e.g., identifying data partitions and/or time periods). The streaming read API may query the hot and cold storage layers based on the identified data partitions and/or time periods. In some embodiments, low level data retrieval components may apply filters to the fetched data. Records from different data partitions may be merged into single result and optional post-processing like sorting or aggregation may be executed.

TSDB—Conceptual Overview

Referring back to FIG. 1, various components and/or elements associated with the TSDB service 104 may comprise, for example and without limitation, one or more of a:
- Table—A set of data elements organized as rows of variable values.
- Variable—An element of a table, identified by name and having a determined data type (e.g., int, double, Boolean, string, etc.). It may operationally have defined for values semantic interpretation (e.g., used for extracting canonical timestamp values from a time axis variable) and optional metadata.
- Selector—A special non-null variable used in a row key. A row key can have multiple elements, which may be referred to as selectors. In general, selectors may be chosen in a way that creates reasonably large clusters of data, balancing the throughput of querying with the latency of filtering out the needed data.
- Data Partitioning Scheme—A set of selectors defined to determine how table rows are organized, thus determining optimal data access pattern.
- Data Partition—A subset of rows having an identical set of selector values. For example, a partition in a table for device data may be a single device, where the selector defined for the table is a device identifier.
- Projection—A replicated physical representation of the data having a different data partitioning scheme. Multiple projections can be defined for a table to provide different data access patterns at the expense of storage redundancy.
- Segment—A physical file stored in an object storage containing contiguous rows of data belonging to the same data partition. Rows in a segment may be ordered by time. Data in each data partition can be stored in multiple segments.

Users can define multiple tables in the TSDB service 104. In come embodiments, additional projections can be defined for each table for different data access patterns, which may enable efficient data access.

IAM Service-Managed Data Management Service Entities

Data management service entities may, in some embodiments, belong to one or more of the following non-limiting categories.
- Subjects—Subjects may comprise actors using the data management service, such as accounts, organizations, and/or groups. Accounts may represent human users and/or programs or scripts, run independently of a user login session. Human users may be identified by user credentials, which in certain embodiments may comprise a pair of email address and password or username and password. Non-human users may be identified by API key credentials, which may comprise a pair of API key ID and API key secret.
- Objects—Objects may comprise entities on which a subject can act. Depending on the data management service, different entities may become objects. Data management service services may expose objects. These services may include a catalog service (e.g., which may be a component of the DV service 114), a SEE service 116 (e.g., components, workloads, deployments, and/or namespaces), an IAM service 110 (e.g., organizations, accounts, folders, groups, privilege sets, privileges, rule sets, role grants, applications, clients, and/or the like), and a TSDB service 104 (e.g., tables and/or namespaces).
- Privileges—Privileges may be associated with granular operations that can be access-checked. An operation may be any functionality a service or application wishes to govern. A single operation can be governed by either a single or multiple privileges. Privileges may be organized into privilege sets, which may define a set of related privileges that can be used to govern a class of objects.
- Groups—Groups may contain soft links to their member accounts, groups, and organizations.
- Folders—Folders may contain either soft-or hard-linked entities. The hard-linked entities may derive their access control from their parent folder, while the soft-linked entities may derive it through hard links to other containers.

Data Management Service Entities—Objects

Data management service objects are those entities on which data management service subject acts. Depending on the data management service, different entities might become objects. For example and without limitation, data management services may expose the following objects:
- Catalog service 138: Data sources, data sets, procedures, and/or workspaces.
- SEE service 116: Components, workloads, deployments, namespaces, as well as others.
- IAM service 110: Organizations, accounts, groups, folders, privilege sets, privileges, rule sets, applications, clients, as well as others. Some entities, such as accounts, organizations, and/or groups, can be both subjects and/or objects.

Data Management Service Entities—Subjects

Certain data management service subjects—accounts—may perform operations on other entities called objects. Other data management service subjects—organizations and/or groups that may aggregate accounts (e.g., directly and/or indirectly)—may be used in rules. Subjects may include, for example and without limitation, one or more of:
- Accounts—An account may represent either human or non-human actors in the system. An account subject may be subject to authentication (e.g., authentication by an authentication service). Once authenticated, they may be allowed access to objects based on evaluation of one or more access control rules.
- Groups—Groups may be comprised of a list of accounts, other groups, and/or organizations. Members of any named groups and/or organizations may be considered as members of the top-level group.
- Organizations—Organizations may comprise members (e.g., accounts) and other sub-organizations. An account may be considered a member of an organization if it is a direct member of that organization, or a member of any of its descendent sub-organizations.

As noted above, while in some embodiments groups and organizations may not be true subjects, in the sense that groups and/or organizations may not be able to log in, or authenticate themselves, they may be considered valid subjects within rules. In other words, it is possible to define a rule that specifies a set of accounts by naming a group and/or organization. When a group is used in a rule set, it may apply to all accounts that are direct or indirect members of that group. When an organization is used in a rule set or policy, it may apply to all accounts that are direct or indirect members of that organization.

Data Management Service Entities—Accounts

When data management service administrators, which may be organization administrators, add users to an organization, they may create accounts. The accounts may be data management service entities that bind users and organizations and represent the user's membership in a particular organization. Users can log into the data management service with their user credentials, which in some embodiments may comprise either of their email address and/or password or a username and/or password. Non-human actors such as, for example and without limitation, scripts, applications, programs, Jupyter notebooks, and/or the like, may log into the data management service using API keys for authentication. Based on provided credentials and/or keys, an account may be located to associate with the authentication, which may become the subject of any API calls made. In certain embodiments, when non-human actors authenticate with API keys, the session may be bound to an account proxy which in turn may be bound to an account. When human users authenticate, they may be bound to an account directly.

The IAM service 110 may generate access tokens, which may be provided to applications or users once they log in. A data management service user can have multiple accounts—each in a different organization. When users with multiple accounts want to authenticate with the data management service, they may specify the organization to which they are logging in. Multiple accounts may have distinct passwords, and therefore authentication with a particular pair of email or username and password may uniquely identify an organization. In some embodiments, this may obviate the need to specify an organization during log in.

In various embodiments, an account may be an object that defines a specific user and associates them with an organization. Accounts may, in some implementations, belong to a single organization (although other embodiments accounts may belong to multiple organizations), belong to one or more groups, and/or can be granted privileges on objects. Accounts may be stored in the data management service directory as child objects of the organization.

Data Management Service Entities—Account Proxies

One or more account proxies may be associated with an account. Each account proxy may either inherit all privileges granted to the owning account, or may be set up to have a subset of those privileges. Each account proxy may have one or more API keys bound to it. The API key credentials associated with an API key allow a non-human actor (e.g., program, script, etc.) to authenticate itself and gain the privileges associated with the account proxy's privileges. In some embodiments, account proxies may be stored in the data management service as child objects of the associated account.

Data Management Service Entities—API Keys

API keys may represent credentials used by non-human data management service actors, such as programs and scripts to authenticate themselves to the data management service. When such a program or script authenticates using API key credentials, the access token that results may represent the account proxy to which the API key is bound. In turn, that account proxy may result in privileges being granted to the non-human actor. API keys may be stored in the data management service directory as child objects of the associated account proxy.

Data Management Service Entities—Organizations

An organization may comprise a basic data management service entity used to organize other entities such as accounts, groups, applications, data sets, deployments, and/or TSDB tables. An organization can have multiple child organizations, which may be referred to in certain instances herein as sub-organizations, but may have a single parent organization. In various embodiments, the parent organization can manage and govern its sub-organizations.

An organization can contain accounts, groups, and other organizations (e.g., internal business division, subsidiary, vendor, or business partner). As used herein, an organization may be an abstract term that does not necessarily represent a single company, but rather a group of entities with which data and applications are shared. Because organizations can be nested in a hierarchy, child organizations may be referred to as sub-organizations. Members of a sub-organization may, in some implementations, be members of the parent organization.

For example, within the ACME organization, there may be sub-organizations such as Sales, Marketing, Purchasing, HR, Finance, etc., and within the Sales sub-organization, there may be sub-organizations corresponding to EMEA and APAC regions. Each top-level organization may be treated as a tenant in a particular deployment. Login related configurations, such as but not limited to password policy, multi-factor authentication ("MFA") requirements, external ID providers, and/or the like, may be restricted to tenant organizations.

Organizations stored as direct children of the root object in the data management service directory may be called tenants.

Data Management Service Entities—ID Providers

ID providers may represent external services that function as authentication services. These may use, for example and without limitation, OpenID Connect, OAuth2, SAML, Active Directory, etc. protocols in order to authenticate a user. Tenant organizations may define one or more ID providers that can be used by members of the organization to authenticate themselves to the data management service.

Data Management Service Entities—Applications

Data management service application entities may be created to represent data management service applications that host clients. Clients may represent web applications that support logging into the data management service. Application entities may also be useful to support defining application-specific privileges for functional permission checking.

Data Management Service Entities—Clients

A data management service client may allow a web application to support acquiring access tokens from the IAM service 110. The client may authenticate itself with the IAM service 110 using an ID and a secret when logging in. In some embodiments, the data management service client may represent a client in the OAuth2 and/or OpenID Connect protocols.

Data Management Service Entities—Groups

Data management service groups may comprise groupings of accounts, other groups, and/or organizations. Data management service groups may use soft links to reference their members. When a group is added to a group, members of the child group may be considered as members of the parent group. When an organization is added to a group, members of the organization, and any of its sub-organizations, may be considered as members of the group. Groups can be referenced in privilege grants to provide privileges to a number of accounts at once. When a group (or organization) is used as a subject in a rule set or role grant, changes to those governance objects (rule sets or role grants) may apply to members of the group (or organization).

Data Management Service Entities—Privileges

Privileges may be associated with granular operations that can be access-checked. An operation can be governed by one or more privileges. Embodiments of the disclosed data management service may define many governed operations, such as delete, list, query, run, or view, but application developers may also be free to define custom operations (e.g., by defining associated custom privileges).

Different privileges may be used to manage data management service entities. For example and without limitation:

To change attributes of an entity, such as a name or an image for an organization, one may need to have the modify privilege.

To add members to an organization, one may need to have the add-child privilege.

Privileges may be identified by a unique ID and may be associated with one or more operations an application wants to govern access to. For example, an application may be a web application having two pages: user and admin. If one wants to only allow access to the admin page's functionality to a subset of users, one might create a privilege called "admin" and grant that privilege to administrators.

Data Management Service Entities—Privilege Sets

Privileges may appear in the directory 112 as children of a privilege set. This may be a container that can have any number of privileges and can reside anywhere in the directory 112.

Certain privilege sets may be standard in the disclosed data management service. A user can create a custom privilege if none of the standard privileges is appropriate for an application. If a user needs a custom privilege, a new privilege set may be created and new privileges may be defined and included within that privilege set.

In some implementations, system privilege set may ones which a certain ID prefix. For example and without limitation, system privilege sets may include, without limitation, "sys: directory", "sys: governance", "sys: application", "sys: security", "sys:audit", "sys:api-key", "sys:account-proxy", "sys:custom-entities", "sys:catalog", "sys:executor", and/or "sys:storage".

The system privilege set "sys:directory", for example, may include one or more of the following non-limiting examples of privileges: list, view, modify, delete, add-child, delete-child and/or modify-read-only-attribute.

These privileges may be used by IAM service 110 directory operations when users manipulate the data management service directory hierarchy. For example, to modify an organization or application object, the user may need to have the "sys:directory:modify" privilege on the object.

Other data management service components may use other privileges. For example, the data service may use the following privileges from its "sys:catalog" privilege set: write-data, call-mutation, inspect-resource, explain-execution, privileged-read-access, query-data, query-datasource, call-query, full-view, delegate-datasource, mutate-data, insert-data, manage-queries, delete-data, manage-execution, mutate-datasource, update-data, read-data, inspect-execution, call-procedure, and/or privileged-write-access.

Applications can define their own privileges (and privilege sets) and then perform access checks, by calling the /security/check IAM service endpoint.

Custom privilege sets may have unique IDs that are DCE/RPC UUIDs ("GUIDs"). A non-limiting example of a custom privilege set unique ID may be of the form: 3475f778-0d3e-4dcf-8237-3f1b022deffe. The privileges within a privilege set can have short strings as names such as, for example and without limitation: admin.

The data management service ID of the above privilege may comprise the concatenation of the privilege set ID and the privilege name. In the above example, the ID of the new privilege may be: 3475f778-0d3e-4dcf-8237-3f1b022deffe: admin Data Management Service Entities—Policies Policies may comprise IAM service objects that are a named list of partial rules. Partial rules may specify the binding of privileges to an object, a depth, and/or an optional restriction and restriction combinator. Privileges in partial rules, like privileges in rules, can specify for each privilege whether to allow or deny that privilege.

Data Management Service Entities—Roles

Roles may be a named list of policies. Roles may exist as a separate object from policies to allow the specification of granular policies and to allow for combining them in different ways in different roles. Policies can appear in multiple roles.

Data Management Service Entities—Role Grants

Role grants may comprise named bindings between a subject and a role, attached to a specific object in the directory. A role grant attached to an object A in the directory can govern the object A, and potentially objects below A in the directory, subject to the depth field in the rules that were constructed from the policies in the roles referenced by the role grant. As one non-limiting example, a depth of 0 may indicate "just this object", whereas a depth of 1 may mean "this object and its immediate children."

Data Management Service Entities—Subject Governance Rule Sets

Subject governance rule sets may be similar to rule sets but may be bound to account proxies and may be used to provide a subset of privileges to those account proxies. They may be used in subject governance, where the privileges may be limited to a subset of the privileges granted to the account that owns the account proxy.

Data Management Service Entities—Subject Role Grants

Subject role grants may be similar to role grants but may be bound to account proxies and used to provide a subset of privileges to those account proxies. They may be used in subject governance, where privileges may be limited to a subset of the privileges granted to the account that owns the account proxy.

DV Service Entities—Data Sources

In some embodiments, DV data sources may represent a source of data which may enable access to data from, for example and without limitation, SQL databases (e.g., MySQL, PostgreSQL, MS SQL Server, Oracle, Redshift, AWS Athena), TSDB tables, InCountry, Parquet files, and/or the like.

DV Service Entities—Data Sets

In some embodiments, DV data sets (e.g., virtual data sets 122-126) may comprise either physical data sets or virtual data sets. Physical data sets may represent, for example, the underlying tables in a SQL data source, TSDB tables, Parquet files, and/or the like. Virtual data sets 122-126 may represent data from multiple physical data sets and other virtual data sets. Data from a virtual data set 122-126 may join data from multiple data sets (e.g., as in SQL JOIN).

DV Service Entities—Procedures

In some embodiments, DV procedures may represent functionality similar to SQL stored procedures. DV procedures may enable querying, updating, and/or deleting data from multiple data sets and/or from multiple data sources.

DV Service Entities—Workspaces

In some embodiments, DV workspaces may represent a grouping construct, much like a folder in a file system, or a folder in the IAM service 110 where data sources, data sets, and procedures may be stored. Governance applied to a workspace may apply to all entities contained within the workspace.

SEE Service Entities—Namespace

A namespace may comprise an environment that allocates the actual resource (e.g., compute and memory) as configured in its definition. Users can run models and container images in the namespace and may be billed for reserved and used resources.

Privileged users can create, terminate, and/or delete the namespace. If there are any jobs running in the namespace while terminating it, the user may be warned but users with special privilege can, in some implementations, force terminate the running jobs in the namespace.

A privileged user can delete the namespace. Once deleted, it may not be recovered but may be maintained in the system records while there is at least one object dependent on it. Unreferenced deleted namespaces may be purged periodically.

SEE Service Entities—Vault

A vault may be designed to securely store secret information known as an asset in the key-value pair format. A privileged user may use and/or modify the assets and may need a special privilege (e.g., full-view) to see the asset value. A vault could be shared with other users to let them use the assets but keep the values secret.

Vaults may be used to save the credentials (e.g., username, password, etc.) for container's private container registry. Such a vault can be used along with image source to access the container registry. Vaults can also be used to store the secret user inputs (e.g., parameters) for the programs and/or models. A user with use privilege on the vault can use these parameters, but may not necessarily know the values.

In some embodiments, a privileged user can delete the vault. Once deleted, it may not be recovered but is maintained in the system records while there is at least one object dependent on it. In certain embodiments, unreferenced deleted vaults may be purged periodically. Objects dependent on the deleted vault may continue to perform until they need to access/use the deleted vault. However, users with a special privilege can force destroy such objects on deleting the vault.

In certain implementations, a vault can be shared with other users without revealing its values. Thus, key-value pairs can be made available to components that require them, without exposing these sensitive values to the users of those components. For example, a vault can include the username and password of a private container registry that holds the image required by a component. Users of that component would be able to deploy it, sourcing the necessary container image from the private registry, without exposing the registry credentials to those users. In some embodiments, this step may be optional but recommended if sensitive information is used within a component. In such cases, vault values can be designated as component parameters, exposing them as environmental variables that may be used by the program running within the component.

SEE Service Entities—Image Source

An image source may be a connection source for the container registry. It may comprise a URL, image name, and/or user email. It may contain the vault (that stores the secret credentials) to connect to the container registry. An image source can be shared with other users as desired.

A privileged user can delete the image source. Once deleted, it may not be recovered in certain embodiments, but may be maintained in the system records while there is at least one object dependent on it. Unreferenced image sources may be purged periodically. Objects dependent on the deleted image source may continue to perform until it needs to access/use the deleted image source. However, users with a special privilege can force destroy such objects on the deleting the image source. The user can use image source to store the connection details of the container registry A container image can be deployed as a component in a workload in the SEE service 116. Users may store the container images associated with components in a container registry with controlled access or may be interested in deploying an image from a public repository. Users can save the container image repository connection details into the image source and secret credentials in the vault. Once defined, these details could be used multiple times to connect and pull a container image whenever required.

SEE Service Entities—Component

A component may represent a program, model, and/or container image. Components may use an image source (e.g., container registry connection details) to pull the container image from the registry. As the container registry connection details may be separated in the image source object, an image source object could be reused by multiple components. If the container image needs secret user inputs for execution, these parameters may be retrieved from the vault.

Components may be deployed within workloads and may contain configurable parameters that allow for customization prior to deployment. Components may be governed objects and users may be granted privileges to view, modify, or use the component in their own workloads.

A privileged user can mount a volume on the component to store the intermediate and/or final outcome of the data processing and/or read the programs, code files, data files, and/or libraries stored in the volume. A component can be linked with more than one volume and, similarly, one volume can be linked with more than one component.

A component may require outgoing connections to different services. A privileged user can add outgoing connection settings. A component may require one or more incoming connections. A privileged user can add incoming connection settings. A SEE workload may hold one or more components together wherein components may represent the same container image and use different input parameters or different container images that users want to run together.

A privileged user can delete a component. Once deleted, it may not necessarily be recovered but may be maintained in the system records while there is at least one object dependent on it. Unreferenced components may be purged periodically.

An object dependent on the deleted component may continue to perform until it needs to access/use the deleted component. However, users with a special privilege can force destroy the dependent objects upon deleting the component.

SEE Service Entities—Workload

Consistent with embodiments disclosed herein, a workload may comprise a unit of work that represents one or more components (e.g., programs, container images, etc.) bundled together. A component in the workload can access the data via the data management service. Component parameters can be overridden in the workload without affecting the original values. A privileged user can create, deploy, modify, and/or delete a workload. Once deleted, in some embodiments it may not be recovered but may be maintained in the system records while there is at least one object dependent on it. Unreferenced workloads may be purged periodically. An object dependent on the deleted workload may continue to perform until it needs to access and/or use the deleted workload. However, users with a special privilege can force terminate the execution of any deployments that use this workload.

SEE Service Entities—Deployment

A deployment may comprise a workload deployed in the SEE environment. A privileged user can create, modify, start (e.g., run), terminate (e.g., stop), and/or delete a deployment. Once deleted, it may not be recovered but may be maintained in the system records while there is at least one object dependent on it. Unreferenced deployments may be purged periodically. Deployment logs may be available for troubleshooting purposes and the execution of a deployment may be monitored in the SEE application.

SEE Service Entities—Volume

In various embodiments, a volume may represent data management service-governed persistent storage. It may be used to save programs, code files, data files, libraries, and/or program output. Volumes can be attached to the components, workloads, and deployments deployed in the namespace and they may persist even beyond namespace destruction. A privileged user can delete the volume. Once deleted, it may not be recovered but may be maintained in the system records while there is at least one object dependent on it. Unreferenced deleted volumes may be purged periodically. An object dependent on the deleted volume may continue to perform until it needs to access and/or use the deleted volume. However, in some embodiments, users with a special privilege can force destroy the dependent objects upon deleting the volume.

TSDB Service Entities—Tables

In various embodiments, a TSDB table may represent a set of data elements organized as rows of variable values. A TSDB table may be used as a DV data set. TSDB tables store data which may comprise a field representing an instant of time.

TSDB Service Entities—Namespace

In various embodiments, a TSDB namespace may provide an organization for TSDB tables. Namespaces may contain multiple data sets and may be conceptualized as schemas.

Data Management Service Governance

Consistent with certain embodiments disclosed herein, the IAM service 110 may support a sophisticated access control system that allows rule sets and/or role grants to be attached to data management service objects. Those rule sets and/or role grants can specify rules that govern the data management service objects named in the rules.

Governance as used herein may involve the enforcement of rules and may involve determining whether a subject has a given privilege to a given object. In some embodiments, a rule set or role grant attached to a data management service object may only govern objects "below" it in the directory hierarchy.

In various embodiments of the disclosed data management service, access checks may comprise a specification of:
Subject.
Object.
Privilege.

For example, the subject may be a user, represented by an account, who has an access token from an application or a service, while the object may be any data management service entity.

In some embodiments, there may be an object in a data management service access check. The user (or more generally an authenticated subject) can attempt to perform an operation on any data management service entity specified as an object. However, to perform an operation on a specific object, the user (and/or and associated subject and/or account) may need the appropriate rights and/or permissions to do so. The IAM service 110 may provide APIs to allow a data management service or any application to perform an access check to determine whether the specified subject is allowed to perform the operation (designated by the privilege) on a specified object.

An access check may return either "true" or "false" indicating whether the subject has the associated privilege on the specified object, along with an optional list of restrictions that may be used to restrict aspects of the operation. For example, a restriction might inform the data service that the subject can only see a subset of the columns in a data set.

In order to attach a governance object (e.g., rule set and/or role grant) to an object in the data management service directory, a user may require the "sys:governance:add-child" privilege on the object. Without such privilege, the user may be denied the ability to govern the object. An attached governance object may govern any objects below its attachment point in the directory, subject to the value of the "depth" attribute of that governance object. For example, of depth of 0 may denote that the governance object only governs the object to which it is attached. A depth of 1 may denote that the governance applies to the attached object and its immediate children. A depth of –1 may denote that the governance applies to any descendant object in the directory. The depth may therefore denote the scope of governance of an attached governance object.

For example, if the user is an organization administrator, they might be able to govern the organization object that represents their organization. They can also govern any objects that they have created "under" their organization. Therefore, the user can create data management service objects where they are allowed to do so and, consequently, they can govern these same objects.

Any object may be specified in access checks. For example, an account might have the custom "admin" privilege on a custom application that represents their (web) application. If they do, they can use the application object as the object in access checks.

Using the application object may be appropriate for the so-called "functional" privileges or operations where no specific object matters in an access check. This could enable or disable certain functionality of the program in question.

The opposite may be true with privileges on data sets (e.g., data management service entities exposed by the catalog service) where many data sets might be present and governed separately.

In at least one non-limiting example, the data service might perform an access check to answer the question "Does this Account have the "sys:catalog:query-data" privilege on this specific data set?"

If the user needs specific object-level access control, they may create data management service entities. The user can use the existing data management service entity types, attach rule sets and/or role grants to these objects and perform access checks by specifying the objects in access check API call.

As a non-limiting example, consider that the user is an administrator of an application called MyApp. There may be a data management service entity called "MyApp" with a data management service ID, which may be a unique ID. The administrator can define rule sets or role grants for this application, and in so doing, specify rules, such as to allow an account and/or a group of accounts the above-referenced "admin" privilege to the application object. Given those rules, the user's application can now use an IAM service "/security/check" API to check a given account's access to perform the "admin" operation on the application.

Many data management service entities (e.g., organizations, groups, folders, etc.) may contain other entities. The relationship between a parent container and a child entity may be called a link. In certain embodiments, links may come in two varieties: soft and hard. A child entity linked to its parent via a hard link may be governed by rule sets attached to the child and those of its parent. This may be true all the way up the hierarchy to the root entity. The root entity may be the object that is positioned at the very top of the hierarchy in the data management service directory. A child entity linked to its parent via a soft link may be considered a child of the parent, but governance may not take into consideration any parents reached via soft links.

Governance in the Data Management Service

Objects inserted into the directory may be governed objects. A governed object may be one for which rules define the operations that can be performed on the object. Governance is a cooperative effort between the services that manage an object. For example, data sets and/or data sources may be managed by the catalog service. These objects may be inserted into the directory 112 (e.g., a hierarchy) as a child of a parent object. For example, a data source might be hierarchically located under an organization object, a folder object, and/or any number of other places. Due to the hierarchical nature of the directory 112, there may be a unique path from the root of the directory to any object in the directory 112. Governance can be "applied" to an object in the directory 112, or to any parent along the path to the root. Any governance that lives outside the direct path from object to the root may not have any effect on the governance of that object.

In some embodiments, governance may be applied using one or more objects that may include rule sets and/or role grants. Regardless of which mechanism is used, the effect may be the same: rules may be created where each grants a single subject, one or more privileges from a single privilege set, on a single object. The privileges in a rule can be allowed or denied. If there is an object hierarchy, the privileges can be inherited to objects below the one referred to in the rule.

Any grant of privileges may be accompanied by a restriction. The restriction may impose additional constraints on the access granted by a given privilege, and these restrictions may be enforced by the service that manages the object. So, in the case of a data set, it may be the data service (which in some embodiments may be a component of the DV service 114) that enforces restrictions. A rule may also have a depth, which may dictate how far down the directory hierarchy, starting at the object specified in the rule. A depth of 0 may specify that the rule grants or denies privileges only on the effective object. A depth of 1 may specify that the rule applies to the effective object and its immediate child objects. A depth of 2 may affect privileges on the effective object, its children, and its children's immediate children. A depth of −1 may mean that the privileges apply to descendant objects starting from the effective object.

The object specified in a rule may or may not be the same as the effective object. Where governance is attached in the directory 112 may be referred to as the attachment point of the governance. The attachment point may be the same as the parent of a governance object (e.g., rule set and/or role grant).

When the governance is attached directly to the object referred to in the rule (such as in the case of rules applied by the IAM application and catalog application), the effective object may be equal to the object. In that case, the attachment point may be the same as the object specified in the rule. However, if the rule specifies an object above the attachment point, the effective object may be narrowed to the attachment point.

Multiple governance objects (e.g., rule sets and/or role grants) may be attached to the same object with each specifying a distinct priority. A governance object with a lower numerical value of its priority may take precedence over a governance object attached to the same object with a higher numerical value. For example, if an object has two child (attached) governance objects, RuleSet1 and RoleGrant1, with, respectively priorities 0 and 1, RuleSet1's Rules may take precedence over RoleGrant1's rules.

As detailed above, governance objects may be attached directly to an object and/or to any parent on the path to the root of the directory. These governance objects may impact the governance on the object. Those governance objects higher up in the directory hierarchy may take precedence over those below them in the directory hierarchy. This may reflect that the management of an organization can impose rules on the subordinates in an organization. Governance objects may be implicitly associated with a level—the level in the directory hierarchy. The root may have Level 0. Immediate children of the root may have Level 1. Governance with a level that is numerically smaller may take precedence over governance with numerically larger values.

Rules

Consistent with embodiments disclosed herein, rules may specify one or more of the following:

Subject ID.
Object ID.
Privilege IDs (multiple, but within the same Privilege S
Allow/Deny flag.
Depth.
Restriction.
Restriction Co nbinator—Used by services and applications to combine restrictions.

Rules may not be data management service entities stored independently in the directory, but rather specified as fields within rule sets.

Partial Rules

Partial rules may provide essentially the same functionality as rules, and may be comprised of the same fields as rules, with exception that may not include a subject. Partial rules may be specified in policies, which in turn may be named in roles. Roles may be specified in role grants, along with a subject. For this reason, the subject may not be needed in a partial rule, since it is specified in the role grant, which grants, indirectly, the privileges in the partial rules of the associated policy.

Permissions

Various embodiments of the disclosed data management data management service may provide for unified data governance, data virtualization, and/or a secure computational environment. Using the data management service objects, an administrator can build a governance layer to enable organizations to securely share data with internal and external stakeholders. The data management service objects may include accounts, organizations, groups, and/or applications.

The data management service may manage hierarchical, role-based relationships between individual user accounts and groups of accounts. It can govern access to resources through the application of rule sets, role grants, privileges, and/or restrictions. The data management service also may also applications to define custom objects and privileges. These custom objects may be stored and managed within the data management service, however their enforcement may be the responsibility of the application itself.

In certain embodiments, the data management service may provide a chain of trust between users and endpoints within corporate and partner networks. The data management service's IAM service 110 may govern access based on privileges, and may comprise security, directory, and metadata services.

Permissions may comprise, for example and without limitation:

Sets of security rules configured by the data management service administrator, embodied by rule sets.

Roles, which include view, edit, manage, and admin, and embodied by role grants.

The following table lists non-limiting examples of roles and their associated meanings.

| Role | Meaning |
| --- | --- |
| View | Grantee may list the object. |
|  | Grantee may view the object's attributes. |
|  | Grantee cannot delete the object, modify the object's attributes, view or modify governance on the object, or add/delete child objects. |
| Edit | Includes view role privileges. |
|  | Grantee may modify the object's attributes. |
|  | Grantee cannot delete the object, view or modify governance on the object, or add/delete child objects. |
| Manage | Includes edit role privileges. |
|  | Grantee may create or delete child objects (e.g., add a member to a group). |
|  | Grantee cannot view, modify, or delete governance on the object. |
| Admin | Includes manage role privileges. |
|  | Grantee may delete the object. |
|  | Grantee may view and modify the object's governance. |

Roles can be granted to any subject within the data management service, including accounts, groups, and organizations. In various embodiments, roles may apply to subjects in different ways including, for example and without limitation:

Roles granted to an account may, in some embodiments, apply only to that account.

Roles granted to a group may apply to all members of that group.

Roles granted to an organization may apply to all accounts within that organization and any of its descendant sub-organizations.

If a user has been granted privileges on an object through multiple grants, such as directly on their account and via membership in a group, the resulting permission on that object may be a union of the granted permissions.

For example, assume account A is a member of the administrators group. If account A is granted the view role on object Z, but the administrator's group is granted the admin role on object Z, then account A may have the privileges allowed by the admin role on object Z.

In some embodiments separate roles may govern one or more of the following non-limiting examples of operations:

View the name and other non-secret information about the data source.

Edit the name and other non-secret information about the data source.

Delete the data source.

View and edit information, including the data source access credentials.

Add/remove physical data sets from the data source.

Administer permissions to the data source.

Governance Objects and Subjects

Embodiments of the disclosed systems and methods may support two main forms of governance: Access Control Lists ("ACLs") and Role Based Access Control ("RBAC").

Embodiments of the disclosed data management service may implement ACLs with rule sets and RBAC with role grants. Rule sets may specify a list of rules explicitly. Role grants, on the other hand, may reference roles, and roles may reference policies. The policies may encode the partial rules. The advantage of using rule sets may be that they are simple, all-in-one, and good for "one-off" governance. Role grants, on the other hand, may involve planning because appropriate policies and roles may need to be defined. However, the advantage of role grants is that there may be one place—the policy—where partial rules are defined, and all role grants for a specific role, reference these partial rules indirectly. This may allow for modification of the policy, and all role grants that (indirectly, through a role) reference the policy will automatically have the effective governance updated.

Audit Service

In certain embodiments, an audit service may capture the security audit records from the various data management services and store them securely in a data store that, in some embodiments, may comprise an append-only data store. These audit records may capture the identification, authentication, authorization, and/or security checks performed by IAM service 110. These audit records may also capture the subject, object, privilege, and any restrictions from any access check, whether performed internally by the IAM service 110, or on behalf of an external data management service (e.g., DV services 114, SEE services 116, and/or TSDB services 104). In some embodiments, the audit service may capture audit records for both successful and unsuccessful operations (e.g., authentication, authorization, and/or access checks).

In some embodiments, data management services (e.g., the IAM service 110, catalog service, data service, SEE service 116, and/or TSDB service 104) may securely send audit records to the audit service. In certain embodiments, such audit records may be tagged with a "component name," identifying the service from which the audit records were obtained.

In some embodiments, audit records capture enough security-context information, which may include the identity of the subject and the object of a successful or unsuccessful operation. The set of audit records associated with a user's action can provide a security administrator with insight into the operations performed by a given user and/or on a specific object. Authentication and authorization decisions performed by the system may be recorded in the audit service.

Audit log entries may include a transaction ID that describes the sequence of operations and isolates the performed actions or queries. In some embodiments, the audit service may guarantee that these log entries are not modified.

In certain embodiments, administrators can view the logs in the audit application. Since in some embodiments viewing audit logs may be a relatively privileged operation, the data management service may grant privileges to perform this operation to a limited set of users. The audit log viewer interface may allow searching of audit log entries by, for example and without limitation, time, range, object, and user.

Examples of Governance of Data from External Sources

In certain non-limiting examples, some embodiments of the disclosed systems and methods may be leveraged to provide data governance solutions for data ingested into a data management service from one or more external sources. For example and without limitation, embodiments of the disclosed systems and methods may allow for ingested data to be manipulated and/or otherwise transformed in a secure and/or sandboxed environment and how generated derived (e.g., transformed) data may be protected and/or governed. The resultant data may then be queried by authorized parties, subject to governance rules established for the derived data.

External data may be generated by a variety of active sources including, for example and without limitation, wind turbines, nuclear reactors, factories, cars, IoT devices, and/or the like. The data may comprise time series data with records produced by the data source being associated with a timestamp. The data may be ingested into a TSDB service 104 and be segmented by the TSDB service 104 by time and/or other data attributes. The data may be first available in a hot storage layer 106, and eventually migrated into a cold storage layer 108. It may be queried by authorized users via an API associated with the TSDB service 104 and may be subject to governance provided by data governance elements of the data management service on TSDB tables and/or via DV service APIs.

Programs and/or applications may run within a sandbox 120 associated with the SEE 116 and may gain direct access to the TSDB ingested data, which may be subject to governance rules. In some embodiments, the sandbox 120 may prevent this data from being exported outside of the sandbox 116. For example and without limitation, machine learning algorithms and/or programs leveraging proprietary models may be executed within the SEE 116 and/or the sandbox environment 120 to derive new data sets from the ingested data. Derived data sets may be stored using APIs associated with DV service APIs to create new data sets in the data management service. Governance on those data sets consistent with various aspects of the disclosed embodiments may ensure only appropriate subjects can query the derived data. APIs associated with the DV service 114 may be used by authorized users to query the derived data, subject to governance on the data sets, which may include restrictions on the rows and/or column values returned.

Users that manipulate and/or query data from the TSDB 104 and/or DV service 114 may be identified and/or authenticated via the IAM service 110. Access checking performed by the DV, SEE, and/or TSDB services 114, 116, 104 may be performed using access check APIs offered by the IAM service 110. Allowed and denied access requests may be audited by an audit service. Sufficiency privileged security administrators may examine the audit records generated and/or maintained by the audit service. Sufficiently privileged security administrators may examine the audit records maintained by the audit service.

In various embodiments disclosed herein, integration of distinct components and/or services within the disclosed data management service may provide for a cohesive governance model used by the integrated components and/or services. An object directory 112 may hold subjects, objects, and/or rules, and may provide for a consistent and/or secure model for manipulating these objects. An SEE sandbox 116 may ensure that data manipulated within it may be prevented from export outside the environment. Subjects, wither associated with the ingesting entity and/or system (e.g., a wind turbine), the software manipulating the data in the SEE sandbox 116, and/or users querying the data sets may be represented in the shared directory 112. Governance rules used to protect the data and restrict access to the data may be similarly stored in the directory. The result may provide a consistent and secure representation of entities providing a secure data storage and/or management solution.

Examples of Application and/or Client-Based Access Control

In various embodiments, access control may depend, at least in part on an application making query requests and/or a client. As discussed above, within the data management service, an application object may represent an application (e.g., a web application) that may make calls to data management service APIs after having acquired an access token from the IAM service 110. A client object may represent a client (e.g., an OAuth2 client) used to authenticate the user to an application. In this manner, an application may be associated with multiple clients, which may not match up to a client device used to access the application. This client may be used during authentication processes, where a client ID and/or a client secret may be used to authenticate an endpoint itself (e.g., an OAuth2 client), a precursor to authenticating a user wishing to make use of the application.

When a user authenticates with an application by, for example, providing the client credentials (e.g., client ID and/or secret) of a client associated with the application, it may receive an access token. The access token may be used with any API call (to any data management service). Certain data management services, however, may not examine what application was used for authentication. For example and without limitation, client "A" may be authenticated to access application "A" and may receive an access token. The access token may then be used from application "B" and application "C," and access checks made against that access token may be the same. This may be used in single-sign-on ("SSO") implementations, where it may be desirable for a user to be able to authenticate using one application (e.g., a web application), and then seamlessly be able to use another application (e.g., another web application) without re-authenticating.

In certain embodiments, a user may be interested in allowing access to a resource (e.g., a data set) by a single application and/or a subset of applications, and/or may wish to deny access to a resource from one or more applications. In certain embodiments, restrictions may be employed with a syntax that allows access to IDs, allowing restriction services to grant or deny access based on the values of IDs. Non-limiting examples of restrictions may comprise:

QueryRows($subject.application.id=78e6c24b-c1fe-422f-8fb5-09c9fb45f0ae')

This restriction may allow querying the rows of the table if the subject's application's ID matches the given one. Denying could use "!=".

QueryRows($subject.application.id in (78e6c24b-c1fe-422f-8fb5-09c9fb45f0ae', 'bf7fe945-1865-4aa3-8686-3f8b502dae22'))

This restriction may allow querying the rows of the table if the subject's application's ID is among the listed ones. Exclusion may use "not in".

QueryRows($subject.client.id='6a5b99a3-7561-4180-ad63-91b8538f3738')

This restriction may allow querying the rows of the table if the subject's client's ID matches the given one.

It will be appreciated that a variety of restrictions may be used in connection with various aspects of the disclosed embodiments, and that any restrictions (including restrictions employing multiple Boolean expressions) may be used in connection with the disclosed systems and methods.

Figure 5:
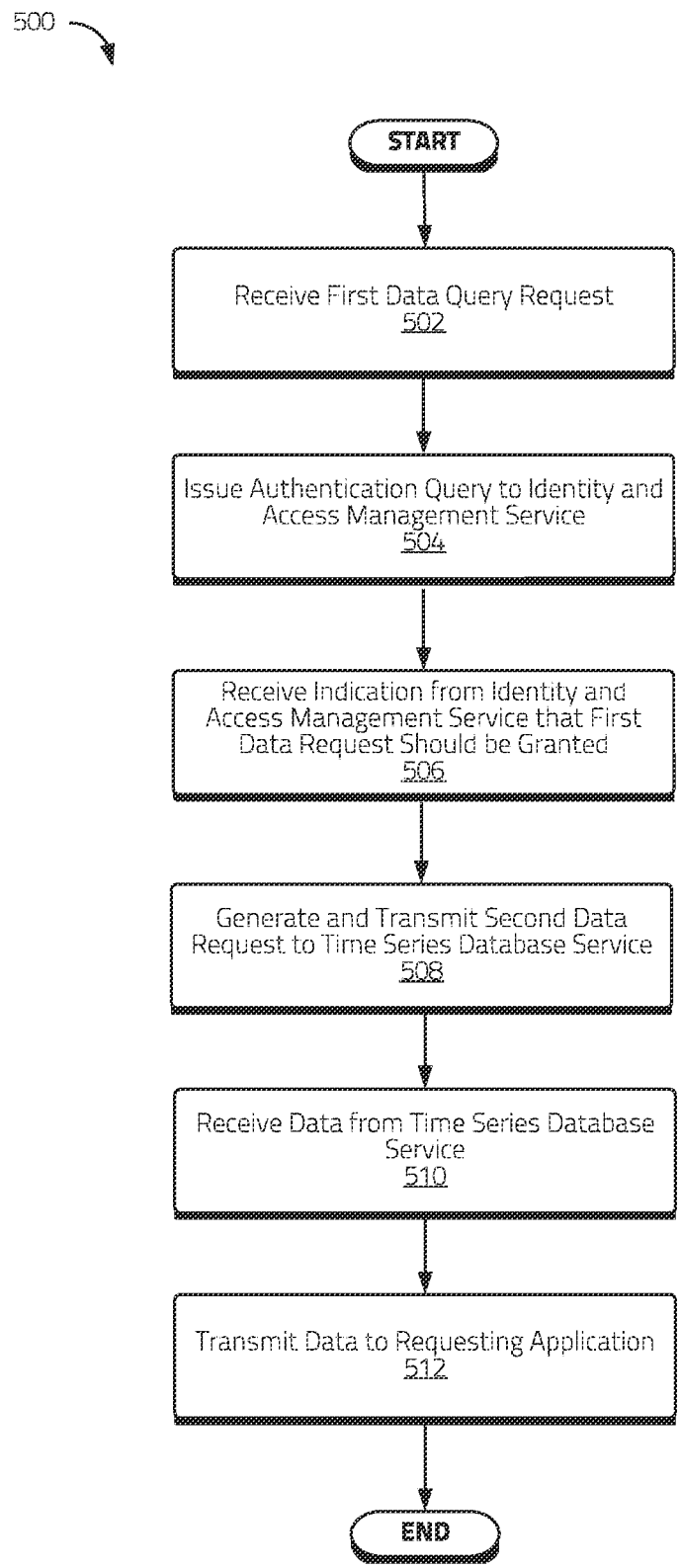
FIG. 5 illustrates a flow chart of a non-limiting example of a data query and access authentication process consistent with certain embodiments disclosed herein.

FIG. 5 illustrates a flow chart of a non-limiting example of a data query process 500 consistent with certain embodiments disclosed herein. The illustrated process 500 may be implemented in a variety of ways, including using software, firmware, hardware, and/or any combination thereof. In certain embodiments, various aspects of the process 500 and/or its constituent steps may be performed by one or more systems and/or services, including systems and/or services that may implement a data management architecture as described herein.

At 502, a first data query request may be received by a DV service executing on the data management service system from a requesting application. In some embodiments, the requesting application may comprise an application executing on a user system different than the data management service system (e.g., a requesting user system and/or the like). In further embodiments, the requesting application may comprise an application executing in a protected sandbox of a secure execution environment, which may be a secure execution environment offered by the data management service system providing the DV service. The first identification information included in the first data query request may comprise information associated with the requesting application, identification information associated with the user system, identification information associated with a requesting user, and/or the like.

The DV service may determine whether the first data query request should be granted. For example, an authentication query may be issued by the DV service to an IAM service at 504. The authentication query may comprise, for example and without limitation, the first identification information, an indication of the requested data set (and potentially requested access rights and/or indications of intended uses of the data set), and/or second identification information that may, in some embodiments, be associated with the DV service issuing the authentication request. At 506, an indication may be received from the IAM service in response to the authentication query that the first data request should be granted by the DV service.

At 508, a second data query request may be generated and issued to a TSDB service from the DV service. The second data query request may comprise, for example and without limitation, one or more of the first identification information, an indication of the requested data set (and potentially requested access rights and/or indications of intended uses of the data set), and/or second identification information that may, in some embodiments, be associated with the DV service issuing the authentication request. In certain embodiments, information included in the second data query request may be used by the TSDB service to authenticate the DV service, the requesting application, the requesting user system, and/or a requesting user with the IAM service and/or another authentication service.

The DV service may receive from the TSDB service data included in the requested data set stored in one or more data stores managed by the TSDB service at 510. In some embodiments, the requested data set may comprise a virtual data set managed by the DV service, and the data included in the virtual data set may be associated with and/or otherwise map to data stored in one or more data stores managed by the TSDB service. In certain embodiments, portions of the data associated with the data set may be included in multiple data stores and/or data storage layers. For example, in some embodiments, a first portion of the virtual data set may be associated with data stored in a cold data store managed by the TSDB service and a second portion of the virtual data set may be associated with data stored in a hot datastore managed by the TSDB service. At 512, at least a subset data received from the TSDB service may be communicated from the DV service to the requesting application, user, and/or system.

Consistent with certain embodiments disclosed herein, data sets may be governed by one or more rules, which may articulate and/or otherwise define one or more restrictions and/or other rights associated with a data set. In some embodiments, the restrictions and/or access rights may be tied to account identity. For example, in certain embodiments, at least one restriction defined in at least one rule associated with the requested data set may be identified. In certain embodiments, the at least one restriction may be associated with at least one identity. Data received from the TSDB service may be filtered based on the at least one identified restriction. The at least a subset of the data communicated from the DV service to the requesting application at 512, user, and/or system may comprise data filtered based on the at least one identified restriction.

Figure 6:
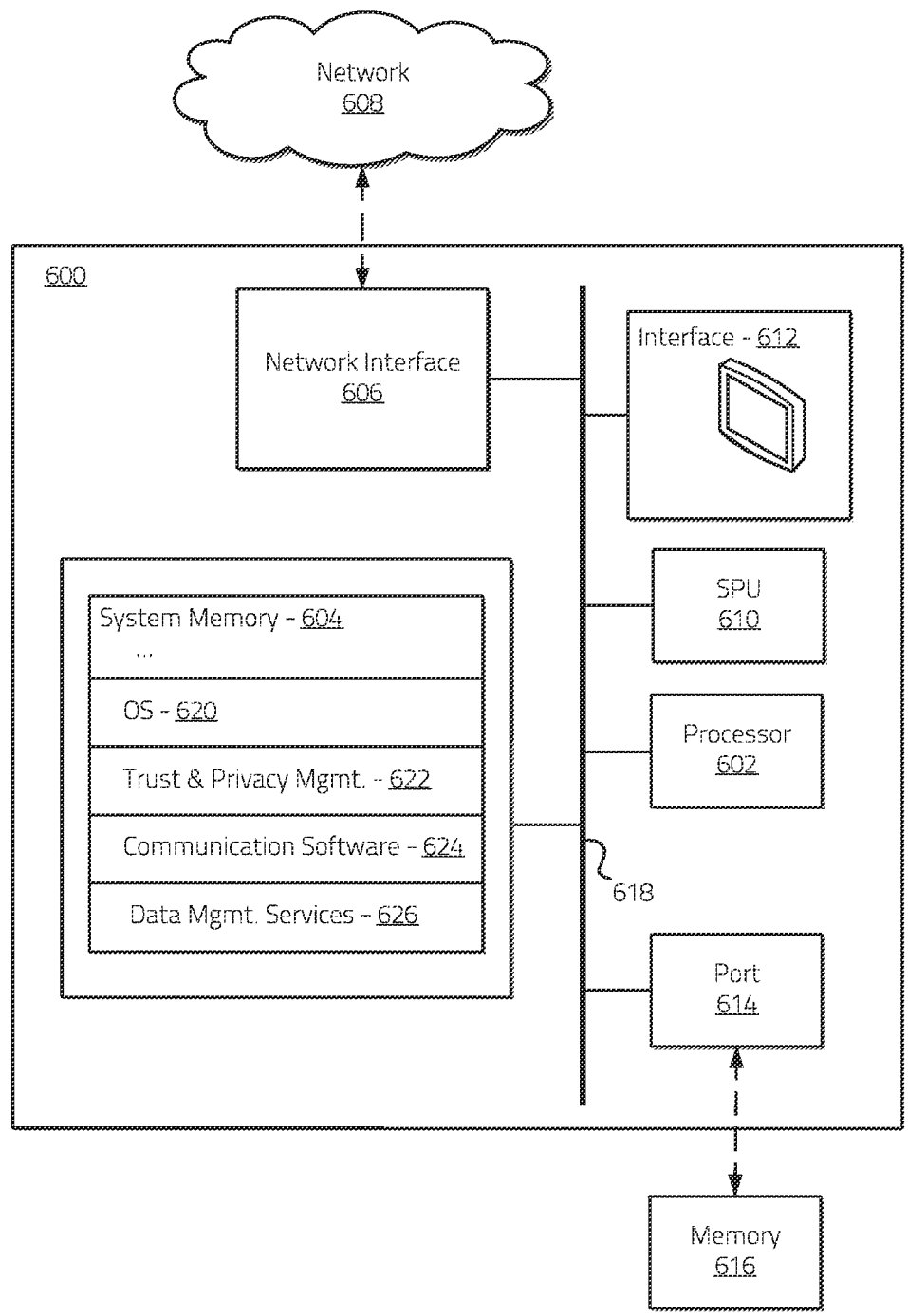
FIG. 6 illustrates a non-limiting example of a system that may be used to implement certain embodiments of the systems and methods of the present disclosure.

FIG. 6 illustrates an example of a system 600 that may be used to implement certain embodiments of the systems and methods of the present disclosure. The various systems, services, and/or devices used in connection with aspects the disclosed embodiments may be communicatively coupled using a variety of networks and/or network connections (e.g., network 608). In certain embodiments, the network 608 may comprise a variety of network communication devices and/or channels and may utilize any suitable communications protocols and/or standards facilitating communication between the systems and/or devices.

The network 608 may comprise the Internet, a local area network, a virtual private network, and/or any other communication network utilizing one or more electronic communication technologies and/or standards (e.g., Ethernet or the like). In some embodiments, the network 608 may comprise a wireless carrier system such as a personal communications system ("PCS"), and/or any other suitable communication system incorporating any suitable communication standards and/or protocols. In further embodiments, the network 708 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network 708 may incorporate one or more satellite communication links. In yet further embodiments, the network may utilize IEEE's 802.11 standards, Bluetooth®, ultra-wide band ("UWB"), Zigbee®, and or any other suitable standard or standards.

The various systems and/or devices used in connection with aspects of the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, systems used in connection with implementing various aspects of the disclosed embodiments may further comprise a secure processing unit ("SPU") configured to perform sensitive operations such as trusted credential and/or key management, cryptographic operations, secure policy management, and/or other aspects of the systems and methods disclosed herein. The systems and/or devices may further comprise software and/or hardware configured to enable electronic communication of information between the devices and/or systems via a network using any suitable communication technology and/or standard.

As illustrated in FIG. 6, the example system 600 may comprise: a processing unit 602; system memory 604, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 602; a port 614 for interfacing with removable memory 616 that may include one or more diskettes, optical storage mediums (e.g., flash memory, thumb drives, USB dongles, compact discs, DVDs, etc.) and/or other non-transitory computer-readable storage mediums; a network interface 606 for communicating with other systems via one or more network connections and/or networks 608 using one or more communication technologies; a user interface 612 that may include a display and/or one or more input/output devices such as, for example, a touchscreen, a keyboard, a mouse, a track pad, and the like; and one or more busses 618 for communicatively coupling the elements of the system.

In some embodiments, the system 600 may, alternatively or in addition, include an SPU 610 that is protected from tampering by a user of the system 600 or other entities by utilizing secure physical and/or virtual security techniques. An SPU 610 can help enhance the security of sensitive operations such as personal information management, trusted credential and/or key management, privacy and policy management, and other aspects of the systems and methods disclosed herein. In certain embodiments, the SPU 610 may operate in a logically secure processing domain and be configured to protect and operate on secret information, as described herein. In some embodiments, the SPU 610 may include internal memory storing executable instructions or programs configured to enable the SPU 610 to perform secure operations, as described herein.

The operation of the system 600 may be generally controlled by the processing unit 602 and/or an SPU 610 operating by executing software instructions and programs stored in the system memory 604 (and/or other computer-readable media, such as removable memory 616). The system memory 604 may store a variety of executable programs or modules for controlling the operation of the system 600. For example, the system memory may include an operating system ("OS") 620 that may manage and coordinate, at least in part, system hardware resources and provide for common services for execution of various applications and a trust and privacy management system 622 for implementing trust and privacy management functionality including protection and/or management of personal data through management and/or enforcement of associated policies. The system memory 604 may further include, without limitation, communication software 624 configured to enable in part communication with and by the system 600, one or more applications, data management services 626 configured to implement various aspects of the disclosed systems and/or methods, and/or any other information and/or applications configured to implement embodiments of the systems and methods disclosed herein and/or aspects thereof.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. For example, it will be appreciated that a number of variations can be made to the various embodiments, systems, services, and/or components presented in connection with the figures and/or associated description within the scope of the inventive body of work, and that the examples presented in the figures and described herein are provided for purposes of illustration and explanation, and not limitation. It is further noted that there are many alternative ways of implementing both the systems and methods described herein. Accordingly, the present embodiments are to be considered as illustrative and not restrictive, and the embodiments of the invention are not to be limited to the details given herein, but may be modified within the scope and equivalents of the appended claims.

What is claimed is:

1. A method for managing data performed by a data management service system, the method comprising:
   generating, by a data virtualization service executing on the data management service system, a virtual data set, the virtual data set referencing data stored in one or more data stores managed by a database service and being generated based on at least one restriction defined in at least one rule associated with the data stored in the one or more data stores;
   receiving, at the data virtualization service from a requesting application, a first data query request, the first data query request comprising first identification information and an indication of the virtual data set;
   determining, by the data virtualization service, whether to grant the first data query request, wherein determining whether to grant the first data query request comprises:
      issuing, by the data virtualization service, an authentication query to an identity and access management service, the authentication query comprising the first identification information and the indication of the virtual data set, and
      receiving, from the identity and access management service in response to the authentication query, an indication granting the first data query request;
   generating, in response to receiving the indication granting the first data query request, a second data query request, the second data query comprising the indication of the virtual data set;
   transmitting the second data query request to the database service;
   receiving, from the database service, the data associated with the virtual data set stored in the one or more data stores; and
   transmitting at least a subset of the data received from the database service to the requesting application.

2. The method of claim 1, wherein the requesting application comprises an application executing on a user system different than the data management service system.

3. The method of claim 2, wherein the first identification information comprises identification information associated with the user system.

4. The method of claim 2, wherein the first identification information comprises identification information associated with a user of the user system.

5. The method of claim 1, wherein the first identification information comprises identification information associated with the requesting application.

6. The method of claim 1, wherein the requesting application comprises an application executing in a protected sandbox of a secure execution environment.

7. The method of claim 6, wherein the secure execution environment comprises an execution environment of the data management service system.

8. The method of claim 1, wherein the second data query request comprises second identification information.

9. The method of claim 8, wherein the second identification information comprises information identifying the data virtualization service.

10. The method of claim 1, wherein the virtual data set is associated with data stored in multiple data stores managed by the database service.

11. The method of claim 10, wherein a first portion of the virtual data set is associated with data stored in a cold data store and a second portion of the virtual data set is associated with data stored in a hot data store.

12. The method of claim 1, wherein the virtual data set comprises data included in another virtual data set.

13. The method of claim 1, wherein the virtual data set comprises a time series data set.

14. The method of claim 1, wherein the identity and access management service is configured to query, based on the authentication query, a directory managed by the identity and access management service.

15. The method of claim 14, wherein the directory comprises a plurality of managed objects, the plurality of managed objects comprising at least a first managed object associated with the first identification information and a second managed object associated with the indication of the virtual data set.

16. The method of claim 14, wherein the first identification information comprises an indication of a managed account within the directory and the indication of the virtual data set comprises an indication of a managed virtual data set within the directory, the managed account and the managed virtual data set being objects included in the directory.

17. The method of claim 1, wherein the method further comprises filtering the data received from the database service based on the at least one restriction to generate filtered data, wherein the at least a subset of the data transmitted to the requesting application comprises the filtered data.

* * * * *